(12) United States Patent
Kim

(10) Patent No.: US 8,263,247 B2
(45) Date of Patent: Sep. 11, 2012

(54) ELECTROCHEMICAL CELL HAVING QUASI-BIPOLAR STRUCTURE

(75) Inventor: Seong Min Kim, Daejeon (KR)

(73) Assignee: Kim's Techknowledge Inc., Daejeon (KR)

( * ) Notice: Subject to any disclaimer, the term of this patent is extended or adjusted under 35 U.S.C. 154(b) by 269 days.

(21) Appl. No.: 12/681,663

(22) PCT Filed: Oct. 10, 2008

(86) PCT No.: PCT/KR2008/005983
§ 371 (c)(1),
(2), (4) Date: Apr. 5, 2010

(87) PCT Pub. No.: WO2009/048300
PCT Pub. Date: Apr. 16, 2009

(65) Prior Publication Data
US 2010/0227209 A1    Sep. 9, 2010

(30) Foreign Application Priority Data
Oct. 12, 2007 (KR) .................. 10-2007-0103032

(51) Int. Cl.
*H01M 10/04* (2006.01)
*H01M 2/26* (2006.01)

(52) U.S. Cl. .......... 429/94; 429/152; 429/185; 429/160; 429/210; 429/156

(58) Field of Classification Search .................. 429/156, 429/153, 94, 160, 210, 149–152, 185
See application file for complete search history.

(56) References Cited

U.S. PATENT DOCUMENTS

| | | | | |
|---|---|---|---|---|
| 6,139,987 | A * | 10/2000 | Koo et al. | 429/210 |
| 7,462,418 | B2 * | 12/2008 | Matsumoto | 429/94 |
| 2008/0070098 | A1 * | 3/2008 | Ray, et al. | 429/53 |
| 2009/0023054 | A1 * | 1/2009 | Jiang et al. | 429/94 |
| 2010/0273036 | A1 * | 10/2010 | Marple et al. | 429/94 |
| 2011/0091753 | A1 * | 4/2011 | Wang et al. | 429/94 |
| 2011/0136015 | A1 * | 6/2011 | Sugaya et al. | 429/231.8 |
| 2011/0250490 | A1 * | 10/2011 | Marple | 429/163 |
| 2011/0274962 | A1 * | 11/2011 | Inagaki et al. | 429/149 |
| 2011/0311864 | A1 * | 12/2011 | Yamada et al. | 429/199 |
| 2011/0318621 | A1 * | 12/2011 | Mineya et al. | 429/94 |

FOREIGN PATENT DOCUMENTS

| | | |
|---|---|---|
| JP | 2004-253284 | 9/2004 |
| JP | 2005-183347 | 7/2005 |

OTHER PUBLICATIONS

International Search Report for PCT/KR2008/005983 filed Oct. 10, 2008.

\* cited by examiner

*Primary Examiner* — Joseph Del Sole
*Assistant Examiner* — Nahida Sultana

(57) ABSTRACT

An electrolyte injection hole is formed in a current collector extension part between negative and positive active material layers of a quasi-bipolar electrode, and another electrolyte injection hole corresponding to the electrolyte injection hole of the quasi-bipolar electrode is formed in a sidewall of a hollow core around which the electrode is wound, so as to easily inject a predetermined amount of electrolyte into each unit cell of an electrode assembly through an electrolyte injection port and the core. Therefore, simple, reliable, and easy-to-manufacture electrochemical cell can be provided.

26 Claims, 23 Drawing Sheets

[Fig. 1]
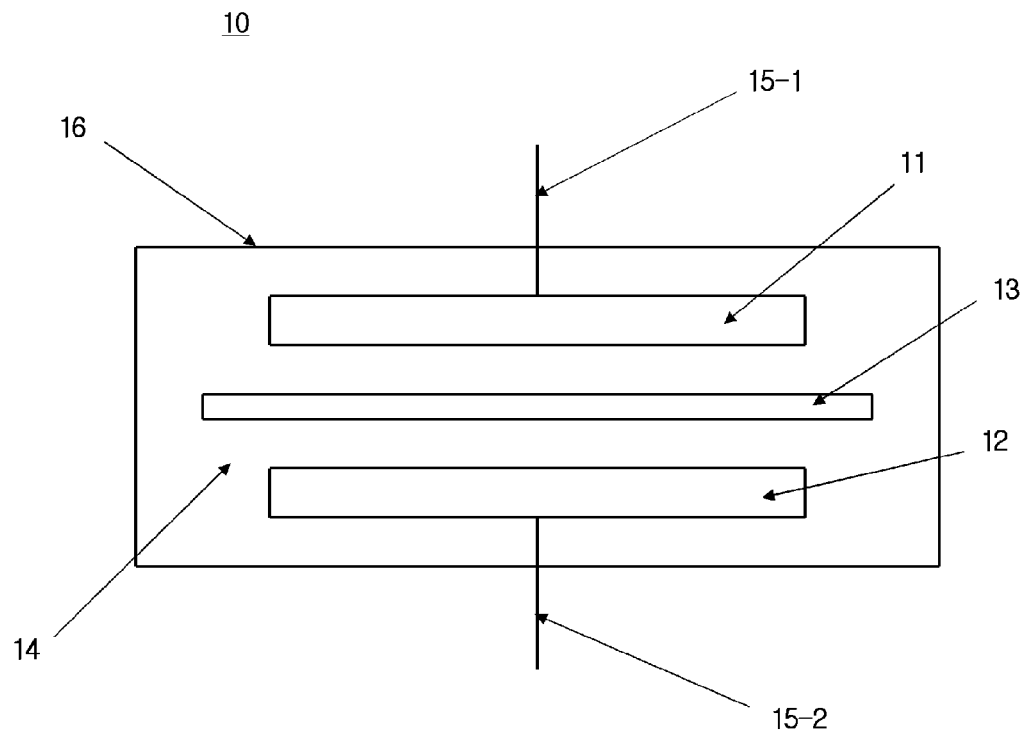
[Fig. 2]
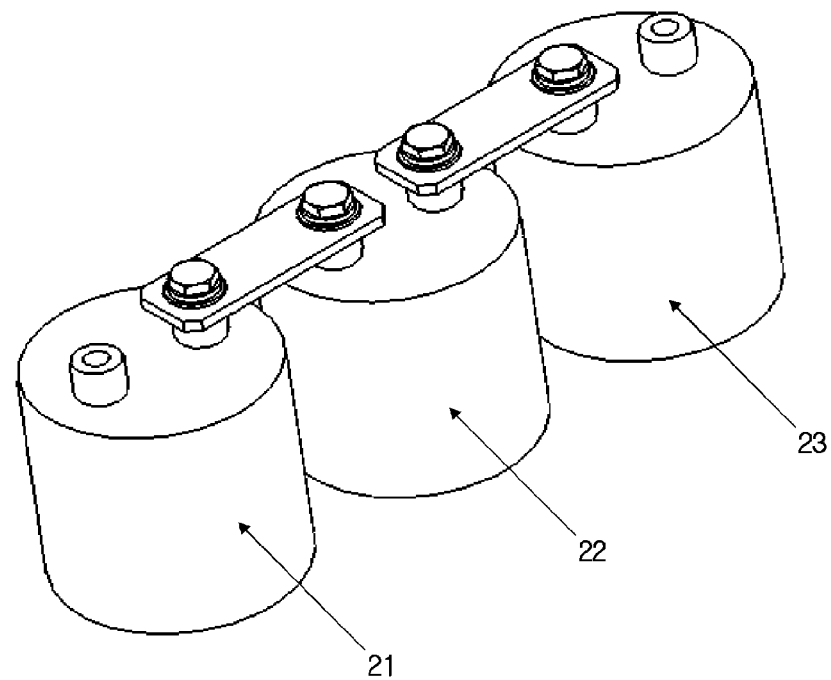

[Fig. 3]
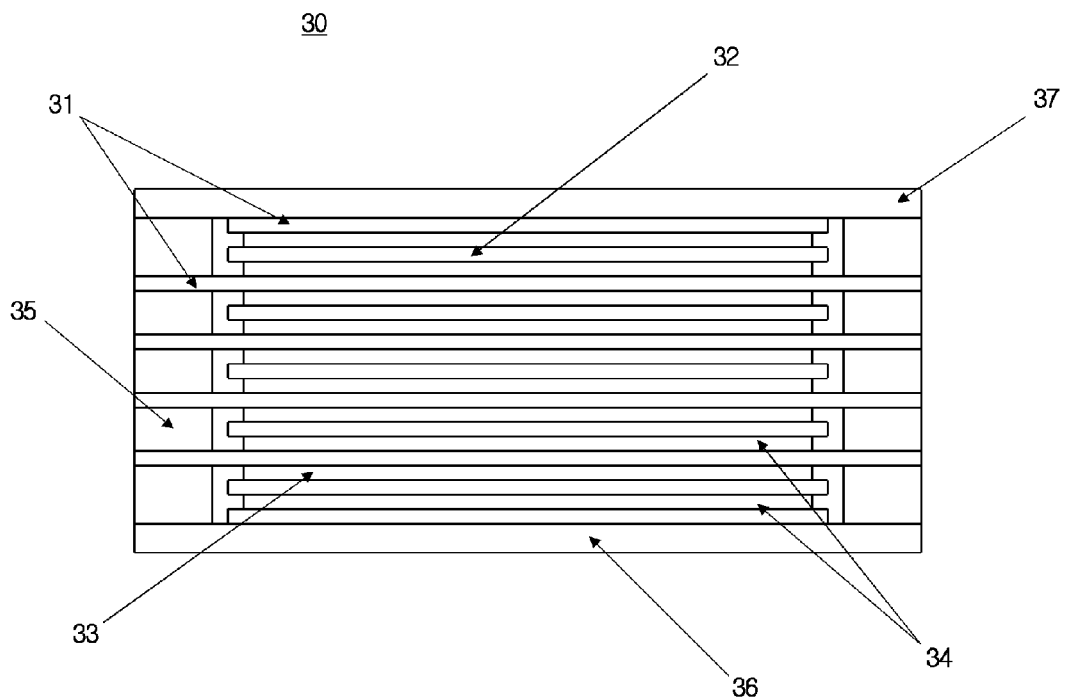
[Fig. 4]
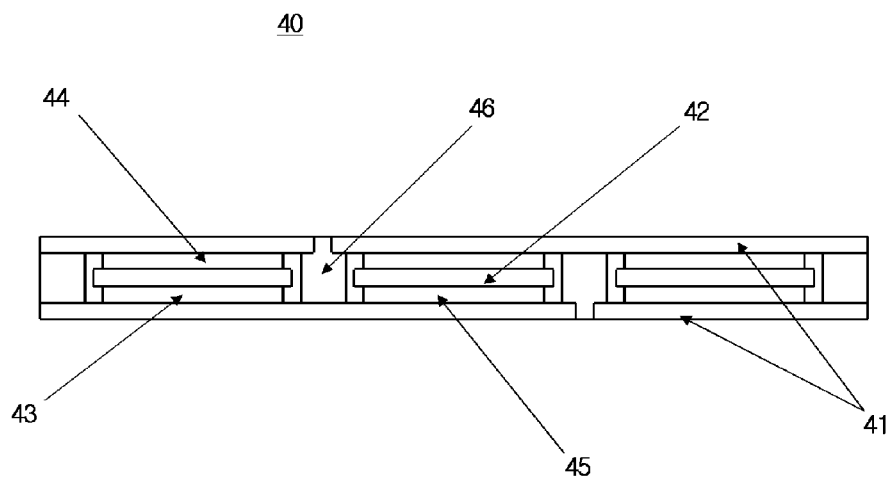

[Fig. 5]
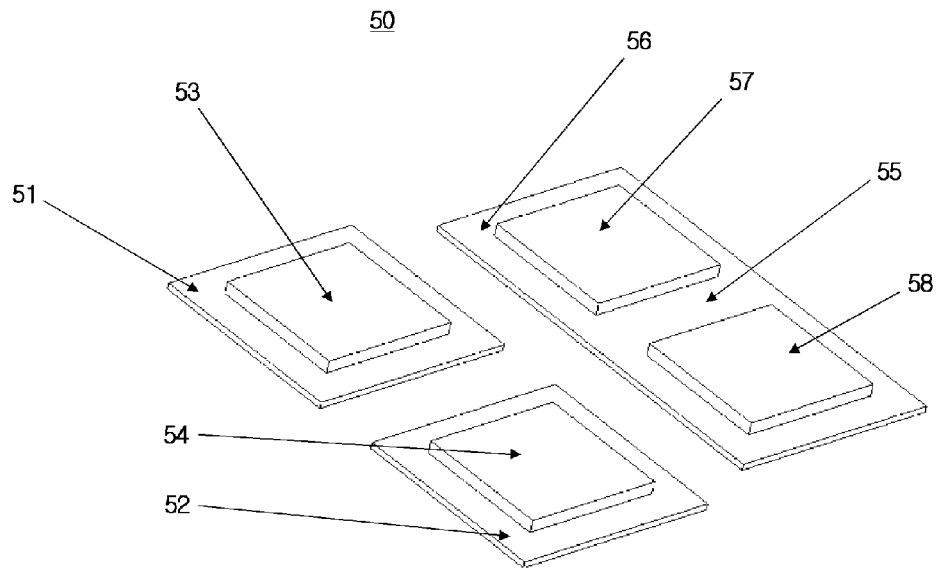
[Fig. 6]
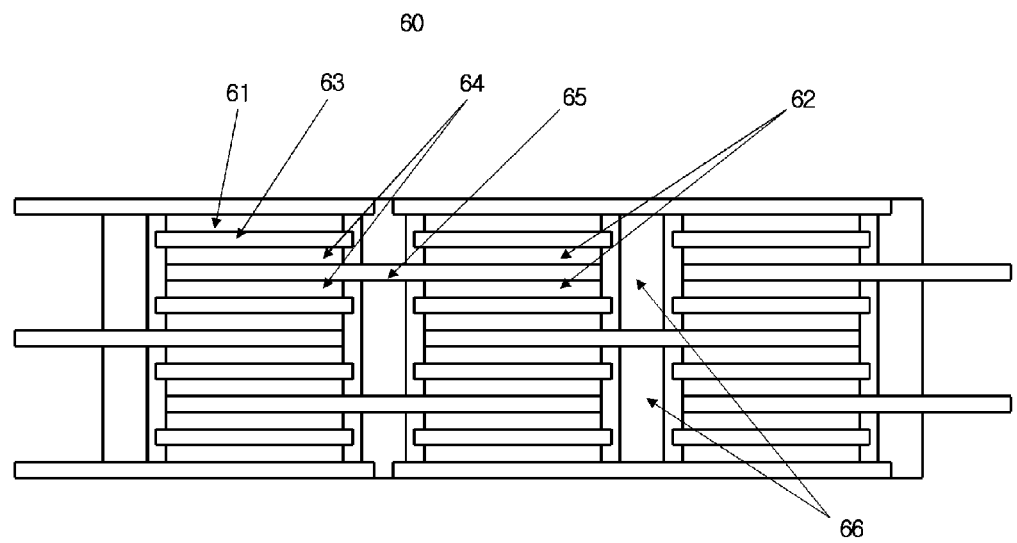

[Fig. 7]
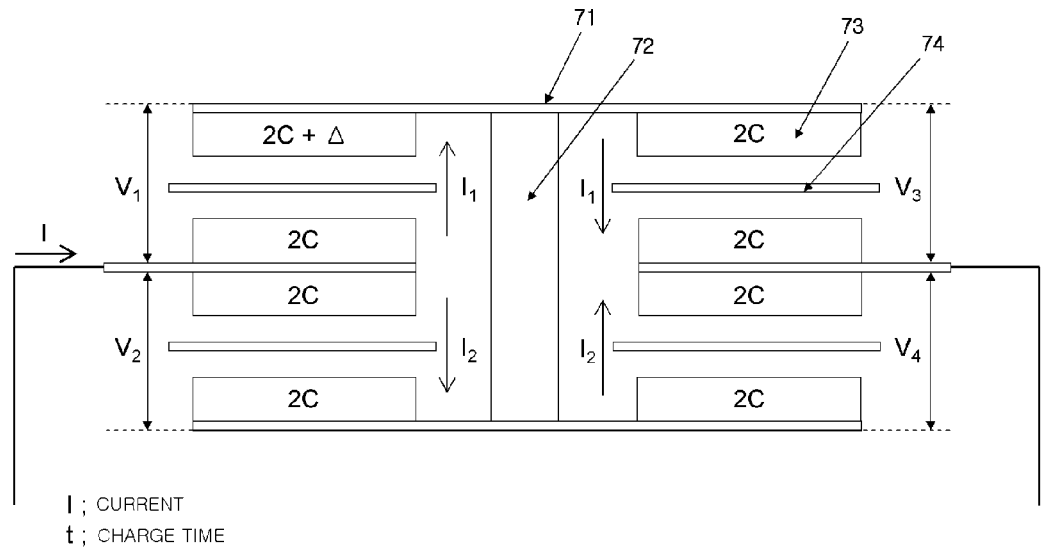
I ; CURRENT
t ; CHARGE TIME
[Fig. 8]
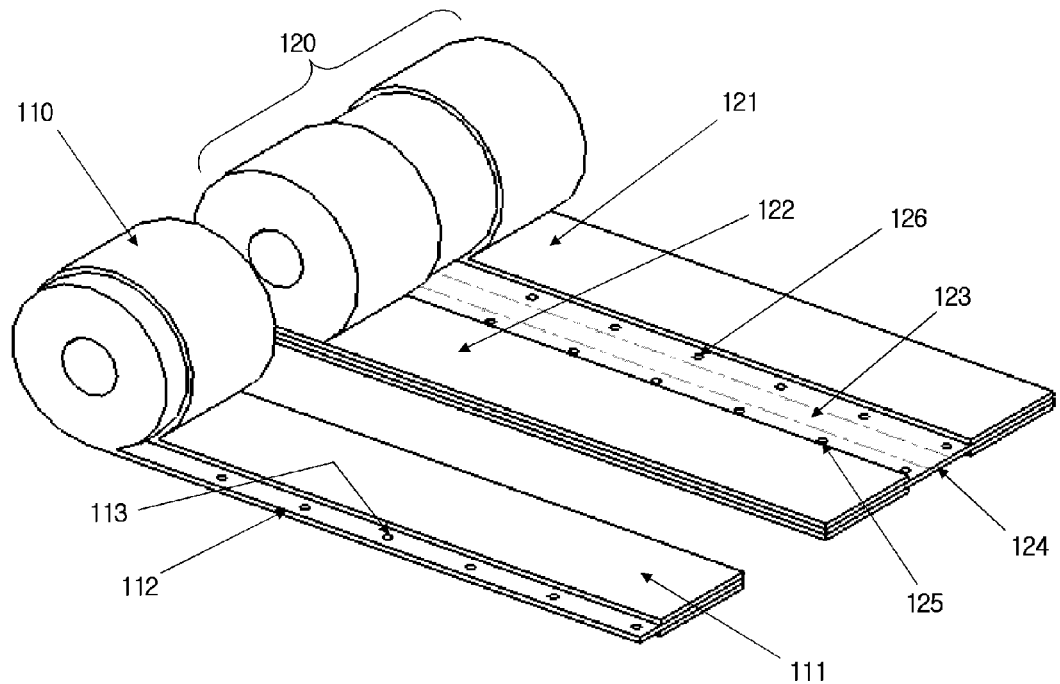

[Fig. 9]
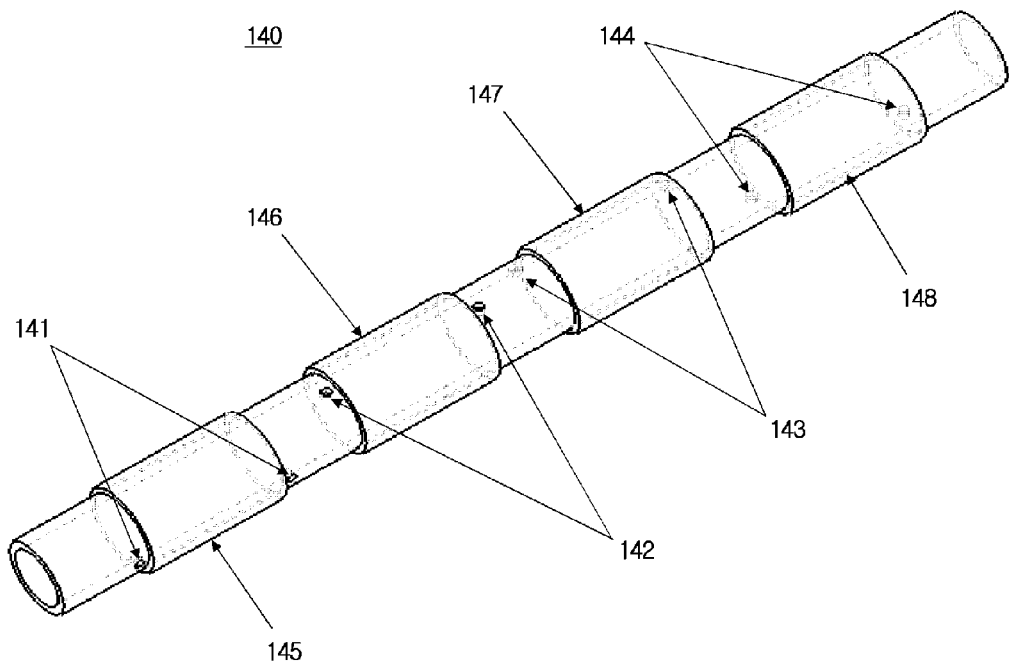
[Fig. 10]
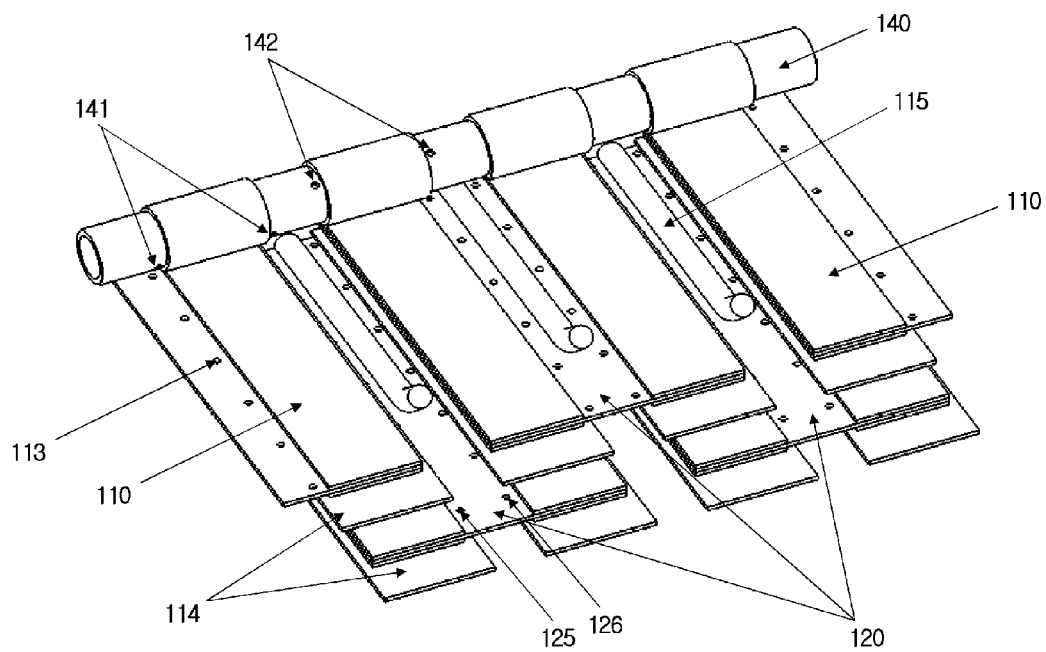

[Fig. 11]
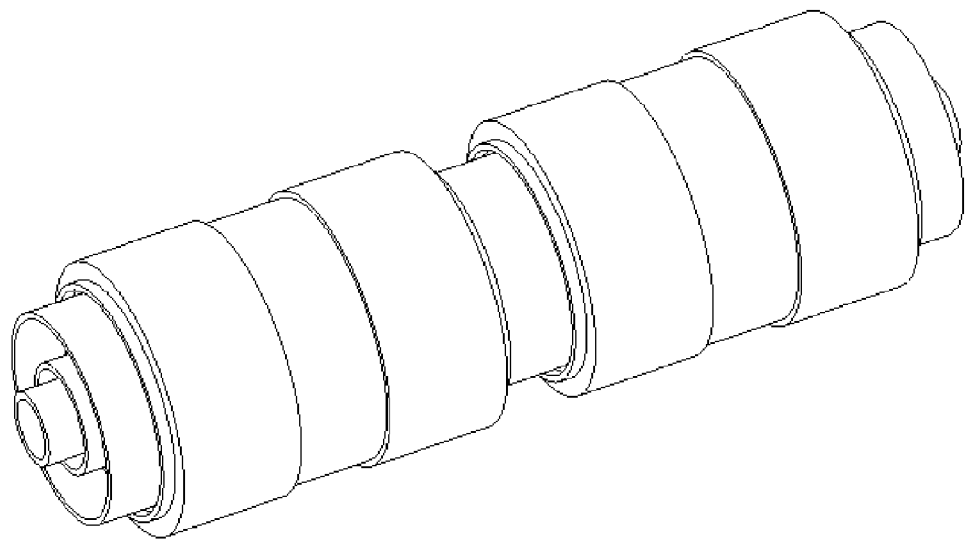
[Fig. 12]
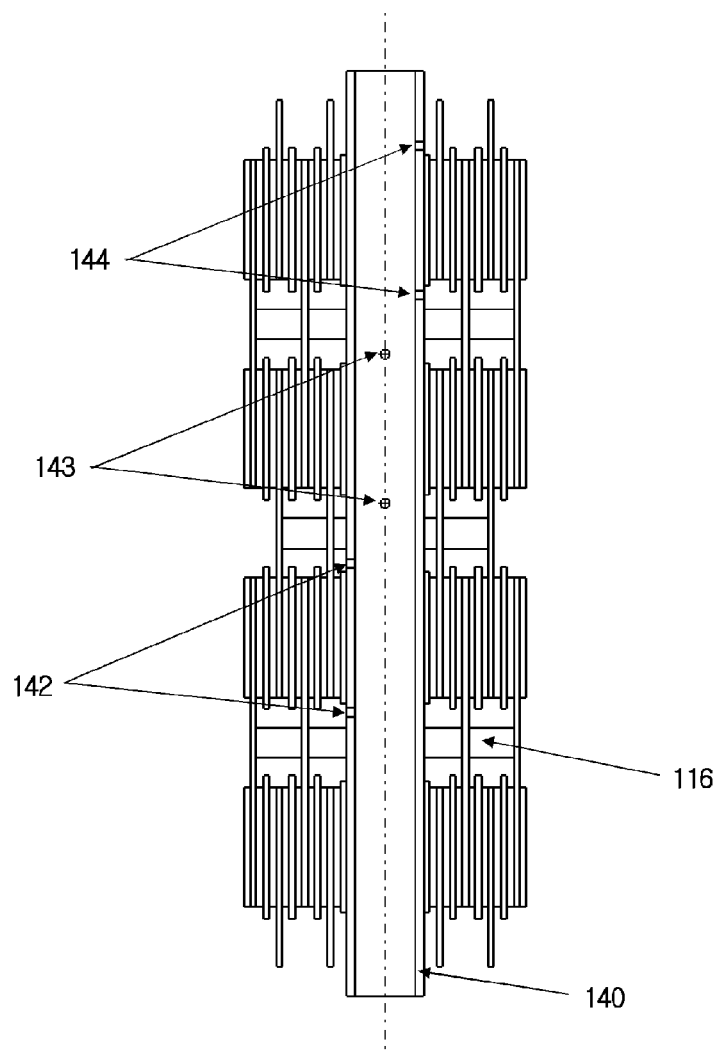

[Fig. 13]
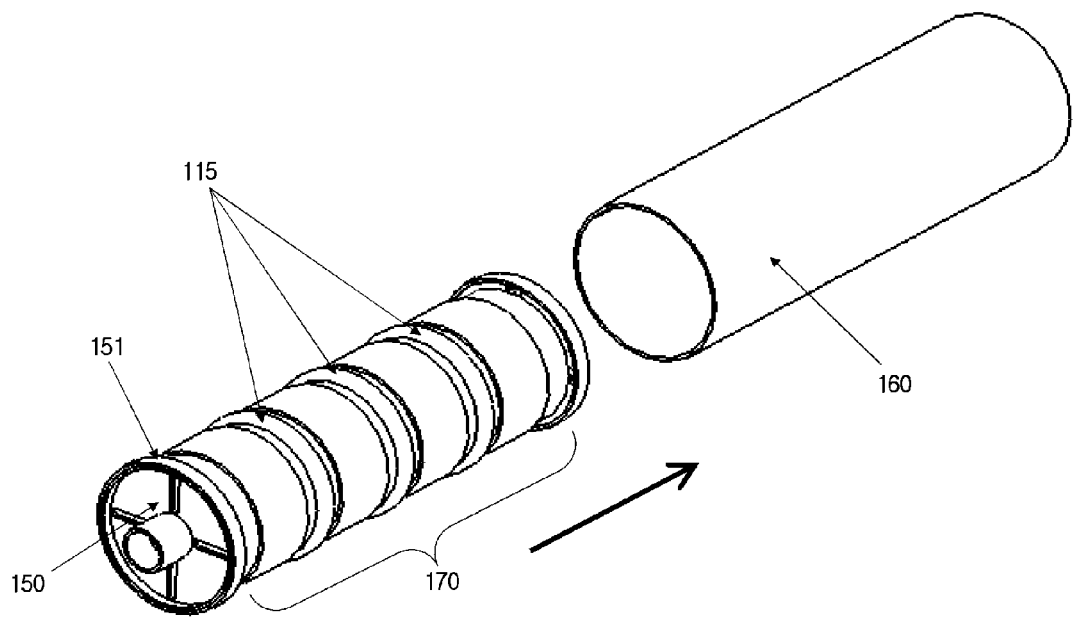
[Fig. 14]
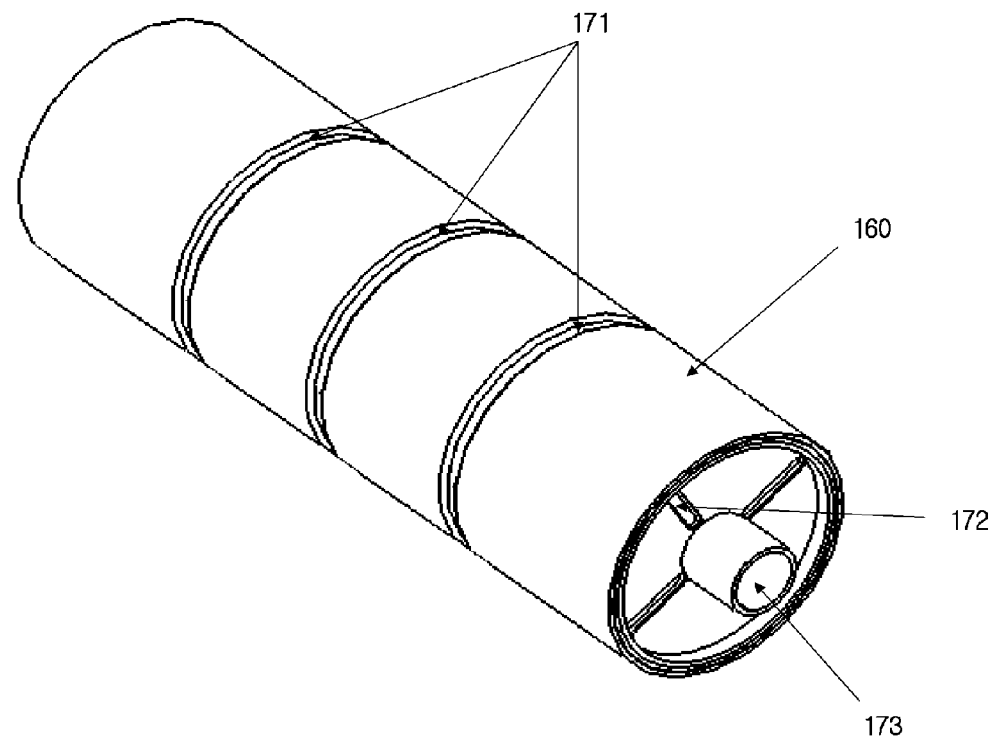

[Fig. 15]
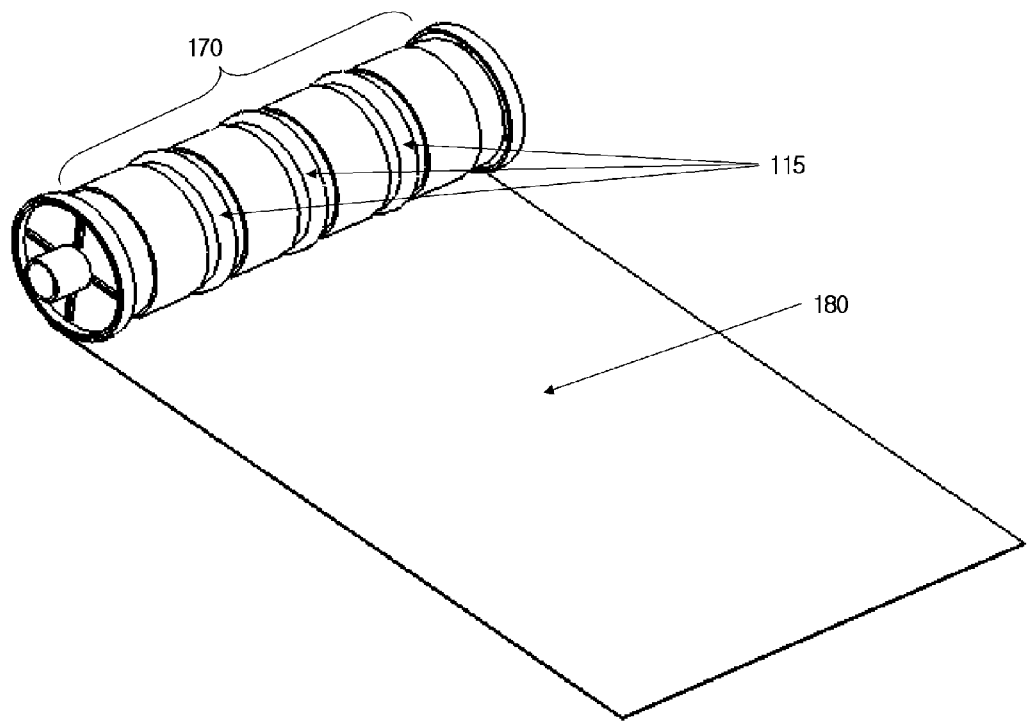
[Fig. 16]
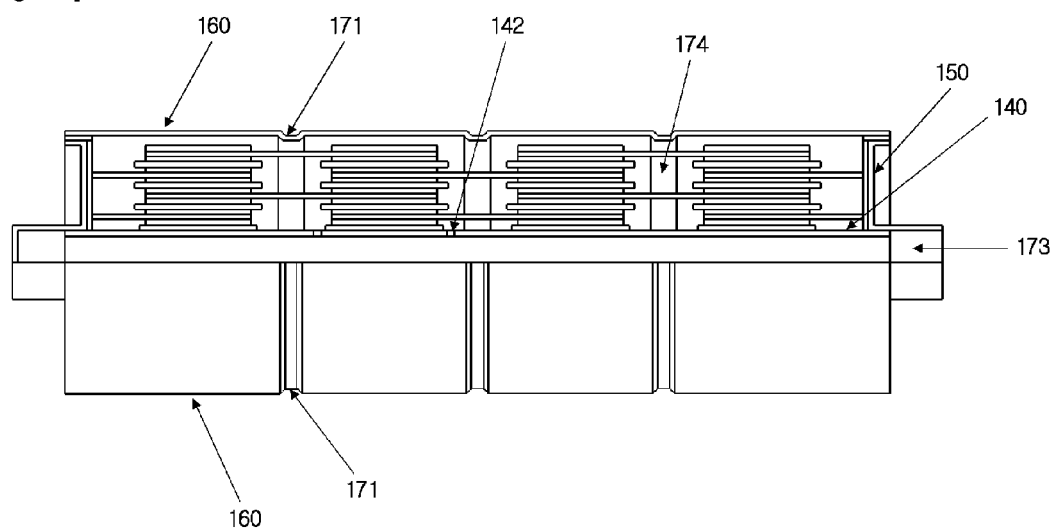

[Fig. 17]
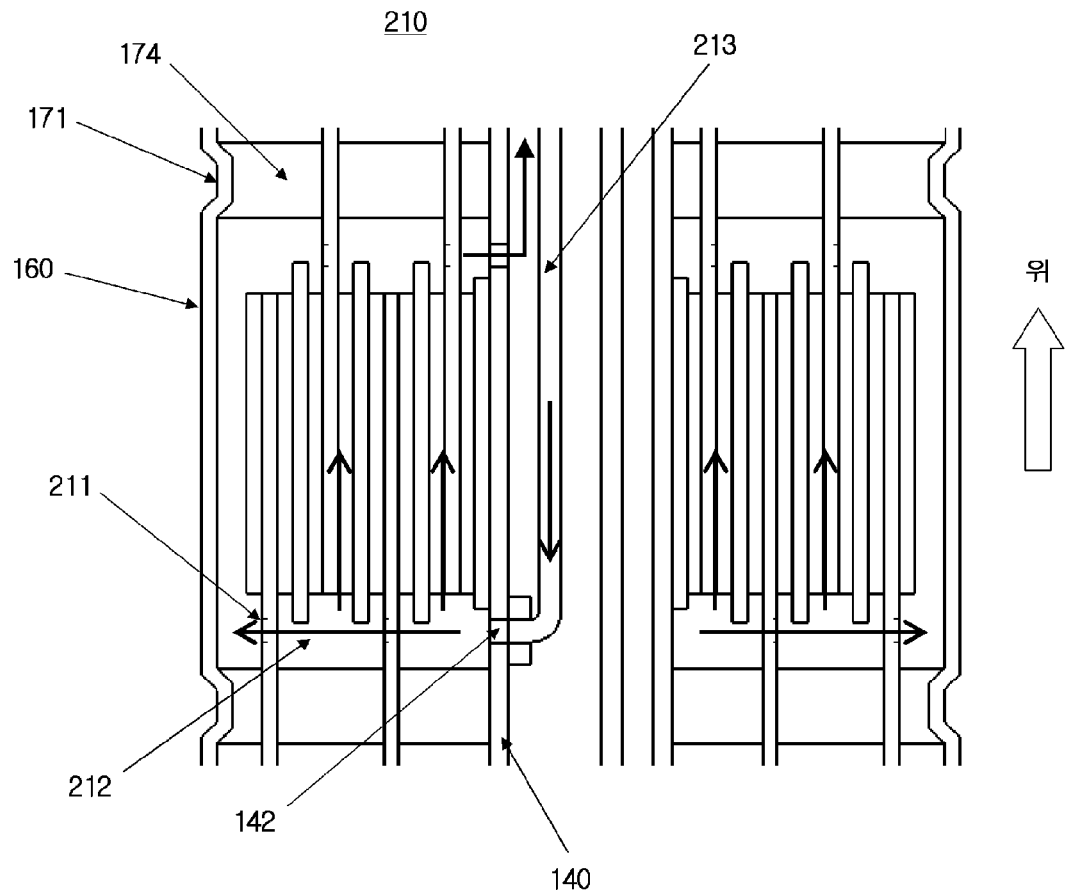
[Fig. 18]
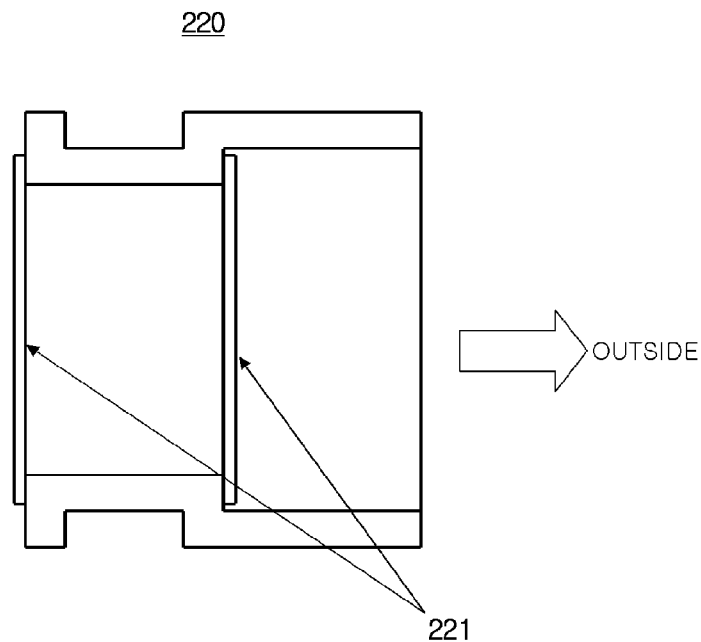

[Fig. 19]
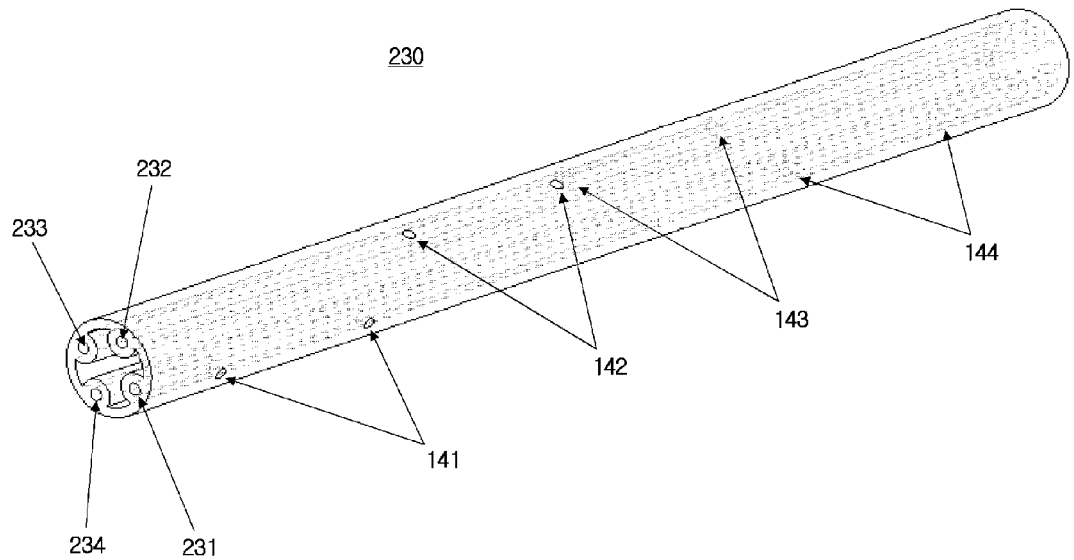
[Fig. 20]
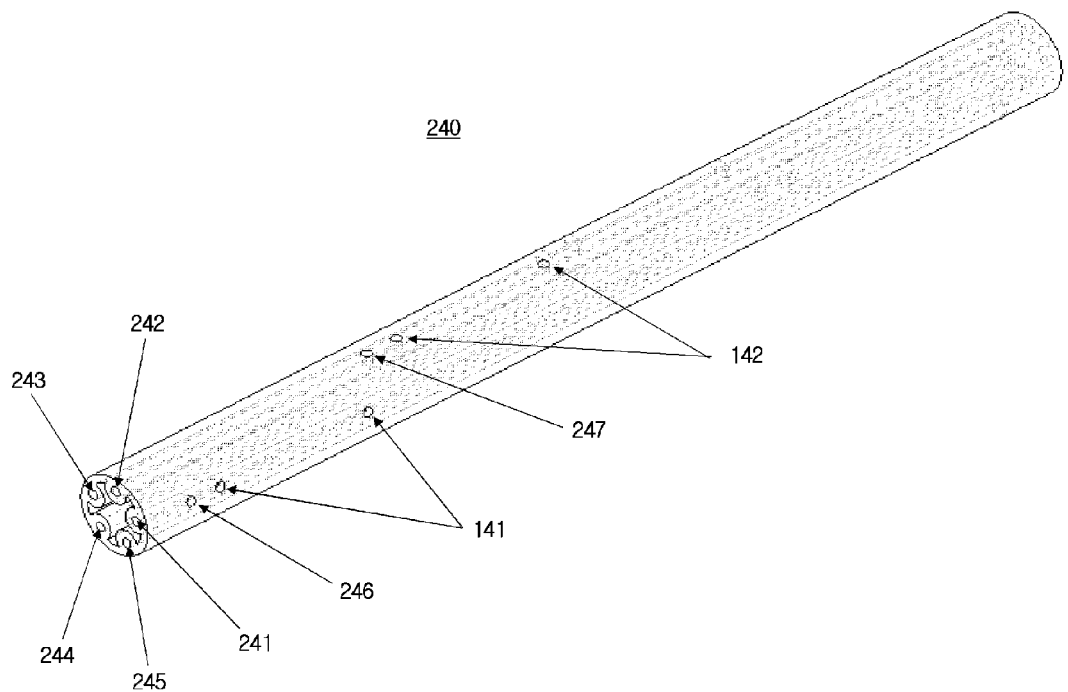

[Fig. 21]
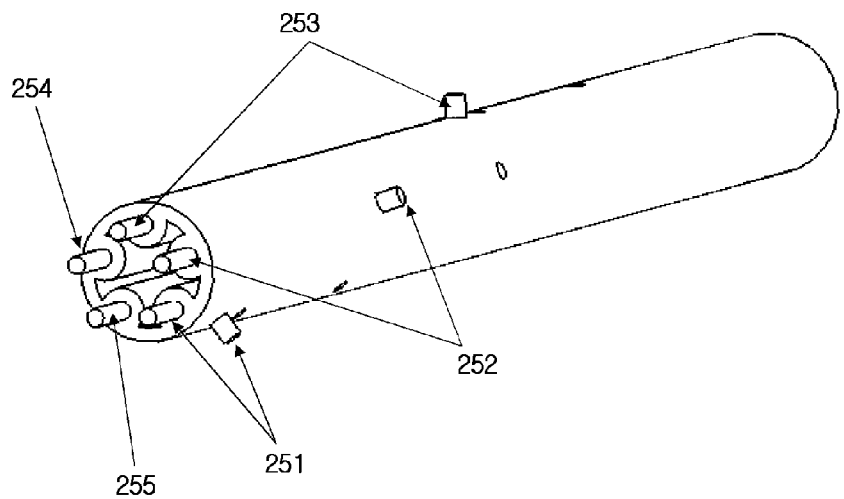
[Fig. 22]
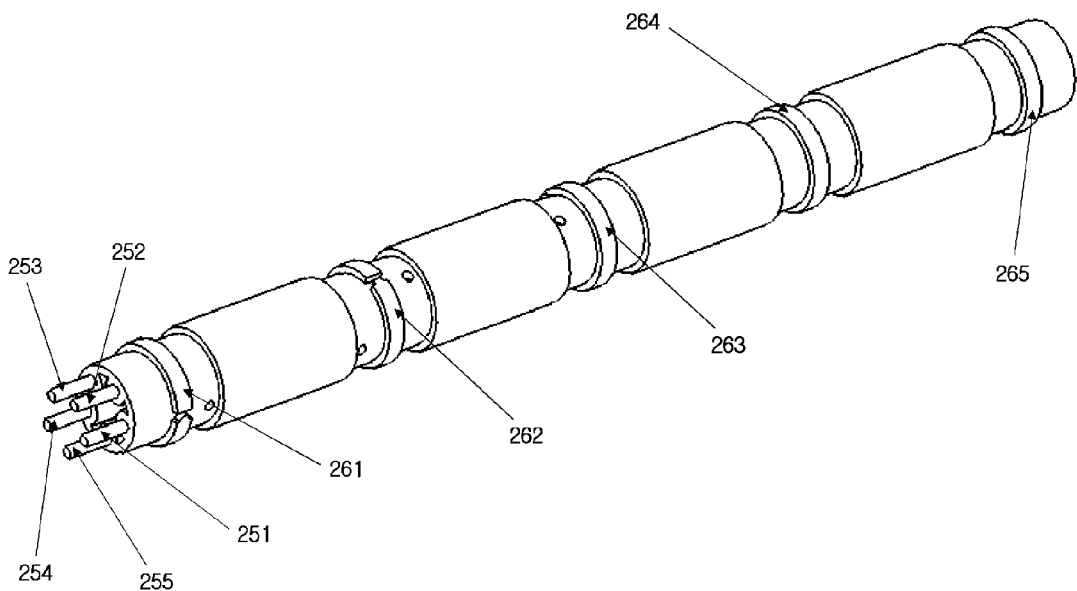

[Fig. 23]
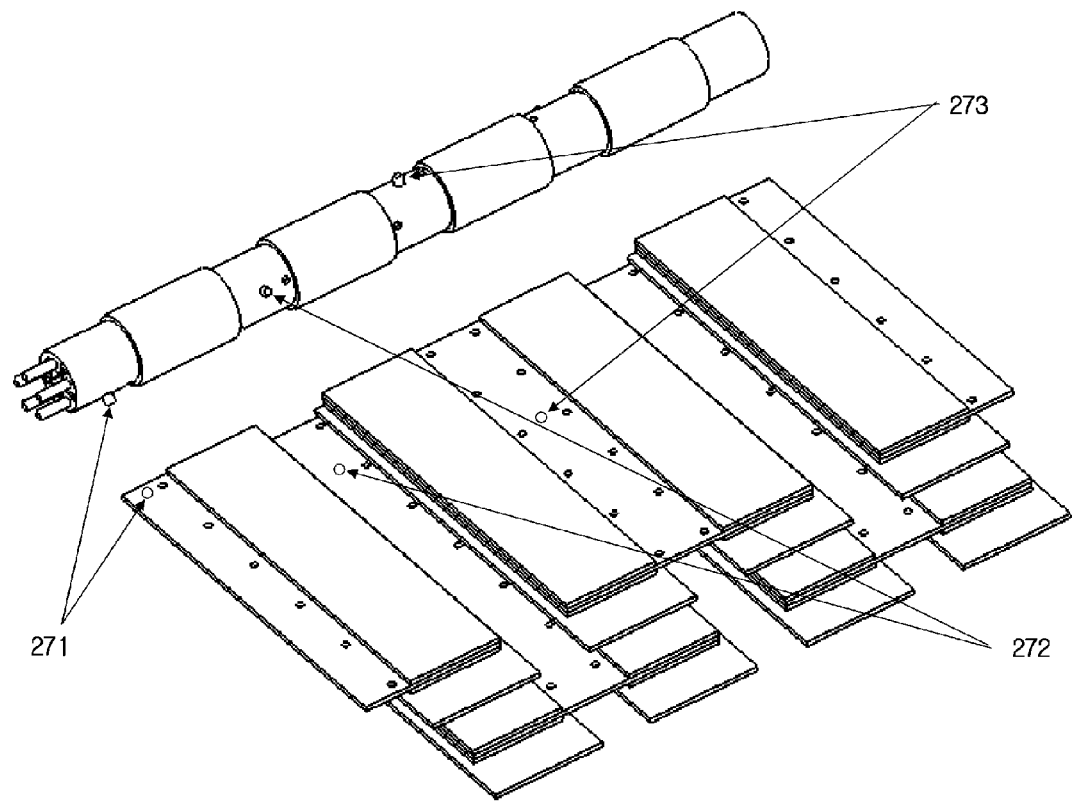
[Fig. 24]
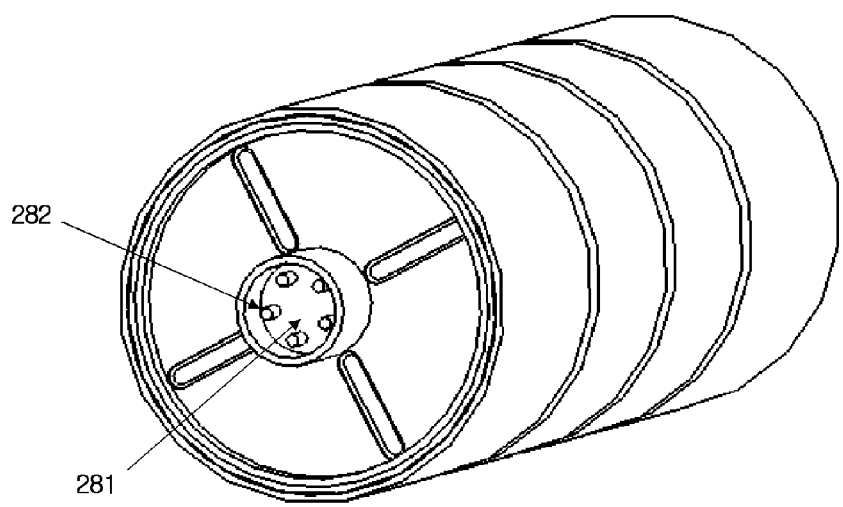

[Fig. 25]
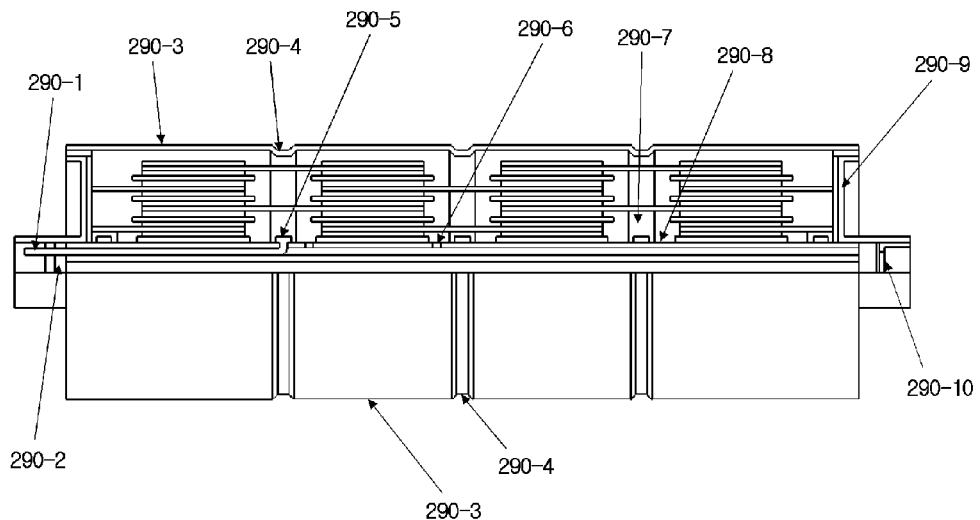
[Fig. 26]
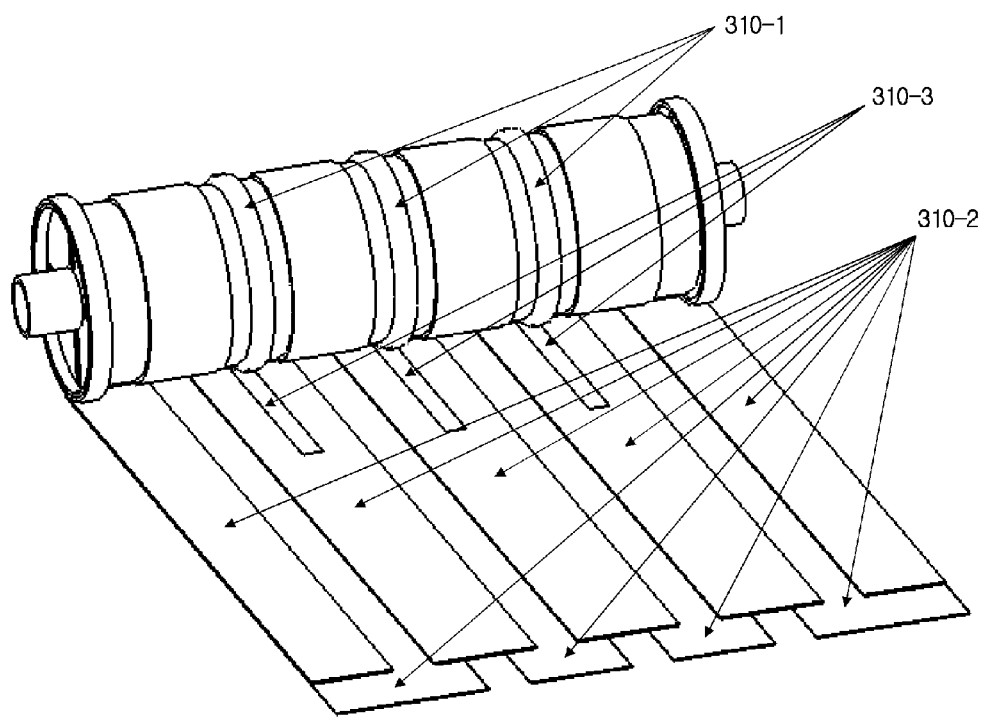

[Fig. 27]
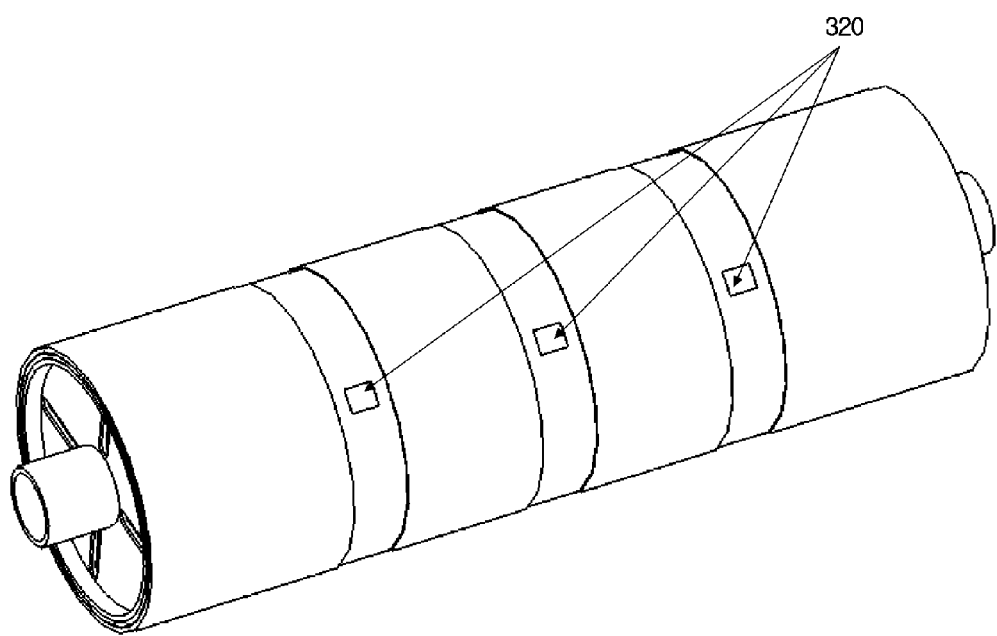
[Fig. 28]
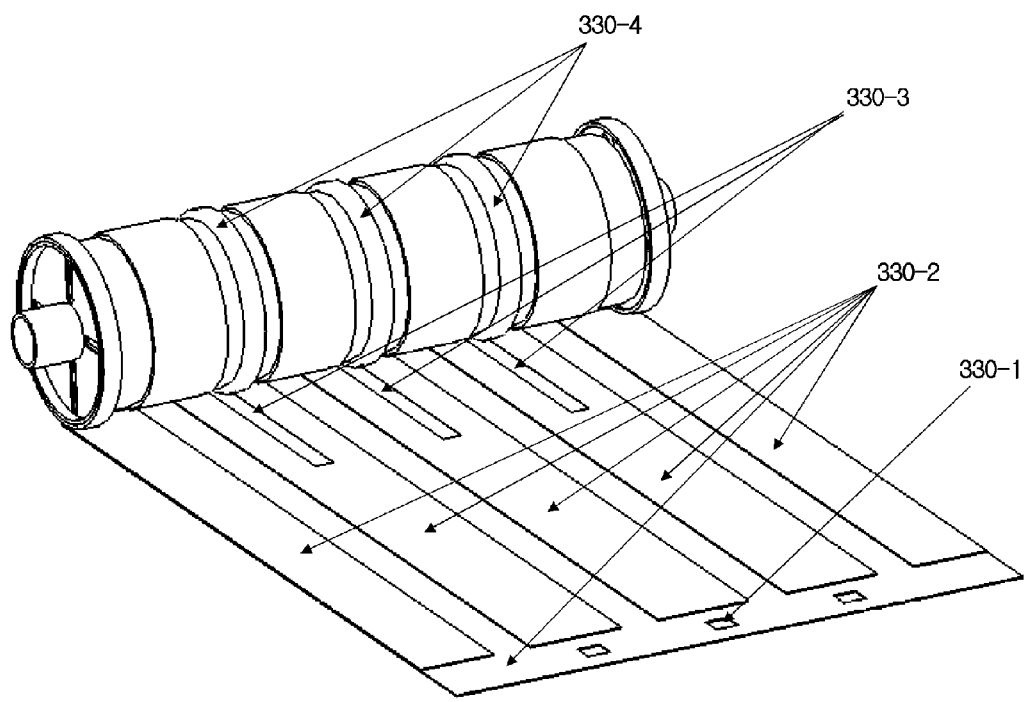

[Fig. 29]
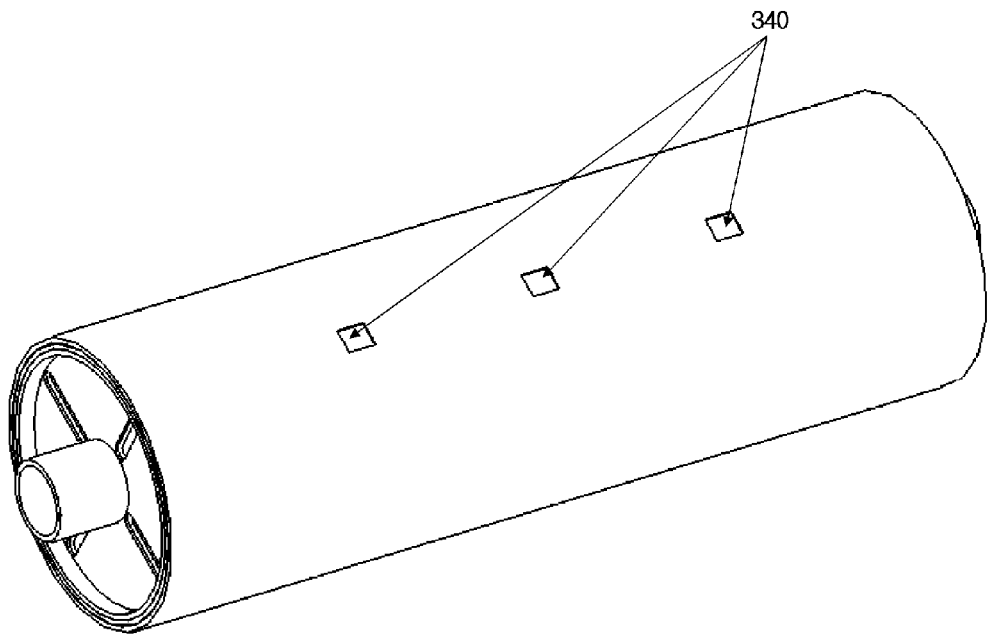
[Fig. 30]
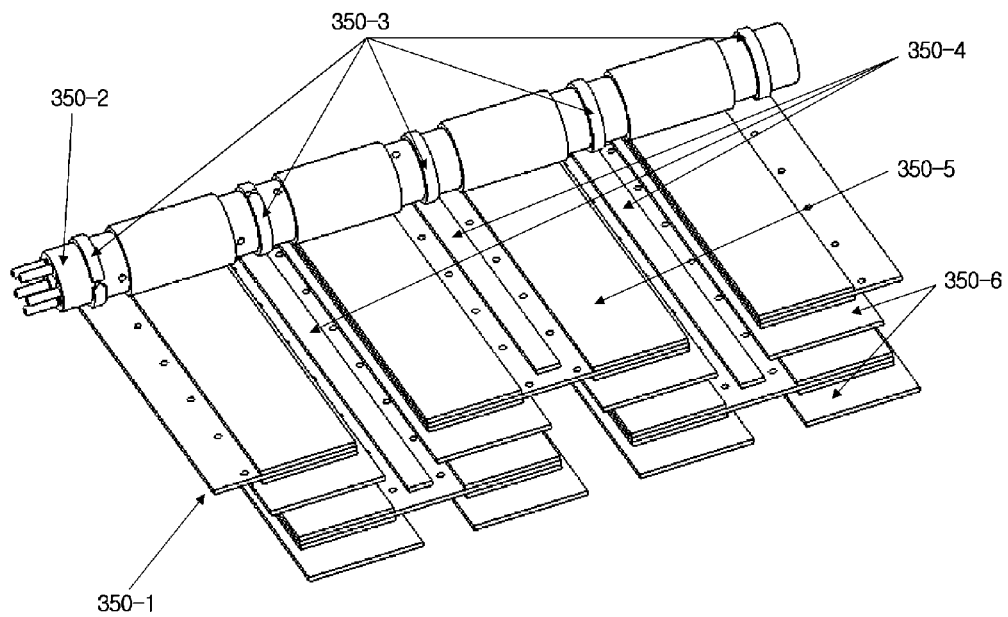

[Fig. 31]
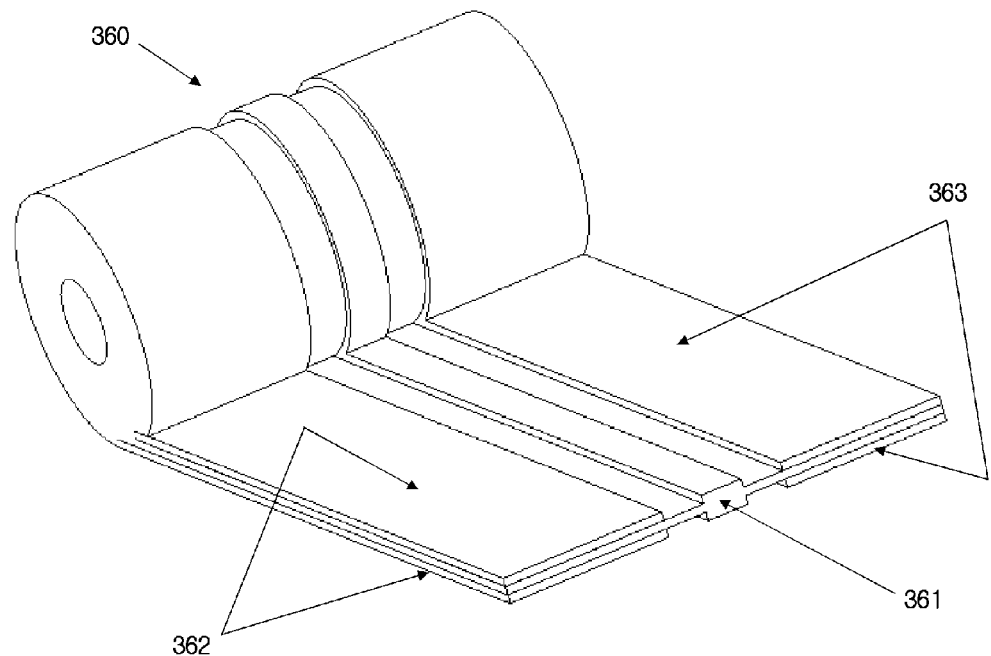
[Fig. 32]
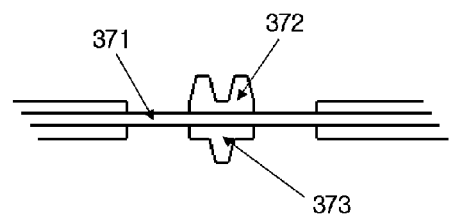
[Fig. 33]
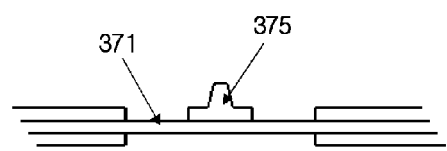
[Fig. 34]
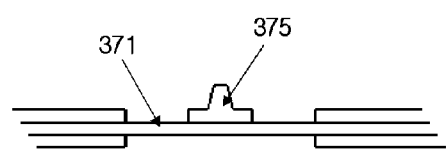
[Fig. 35]
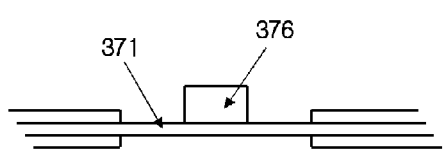

[Fig. 36]
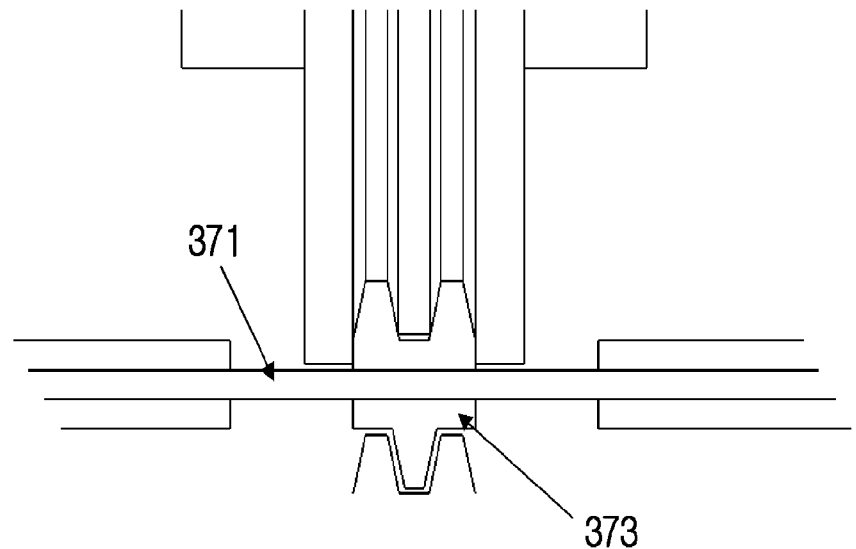
[Fig. 37]
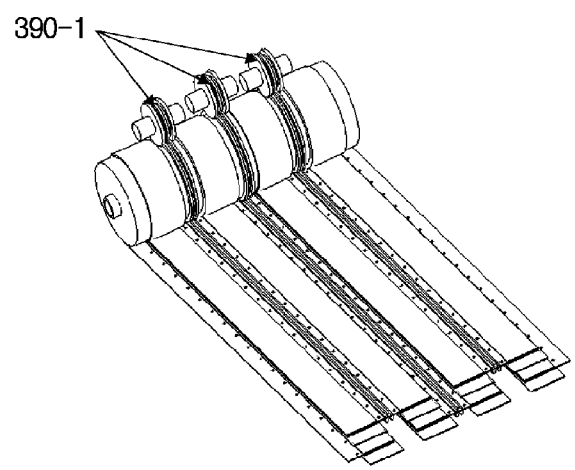
[Fig. 38]
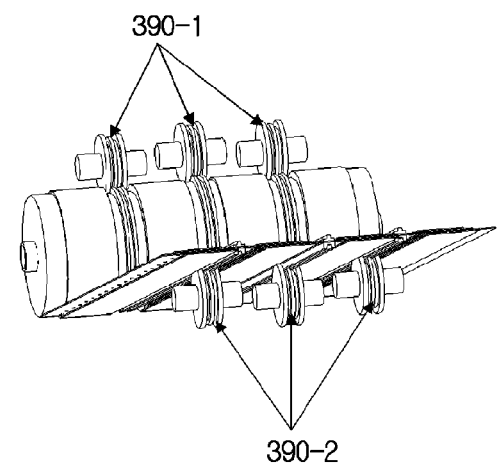

[Fig. 39]
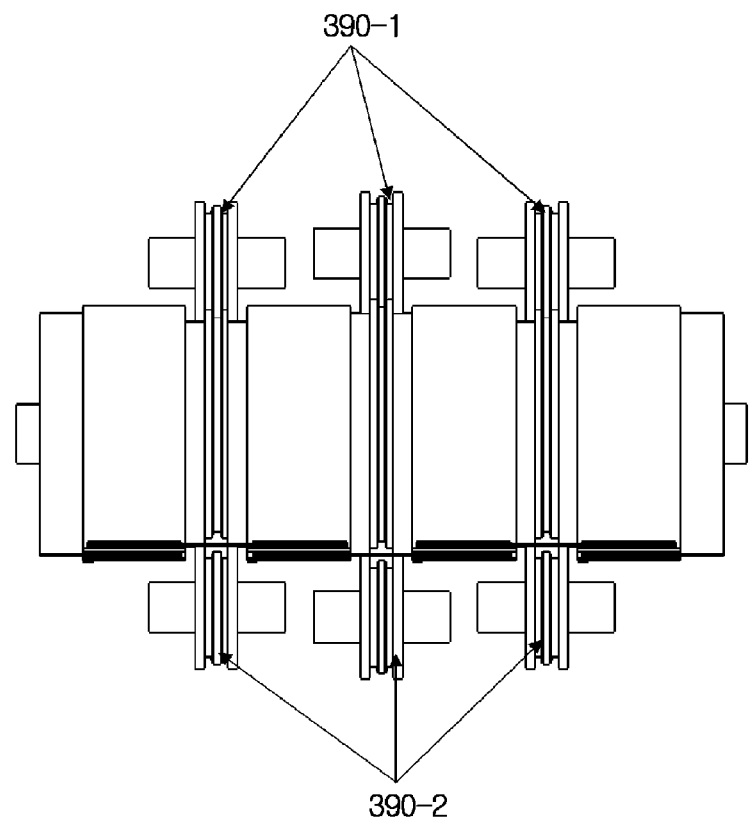
[Fig. 40]
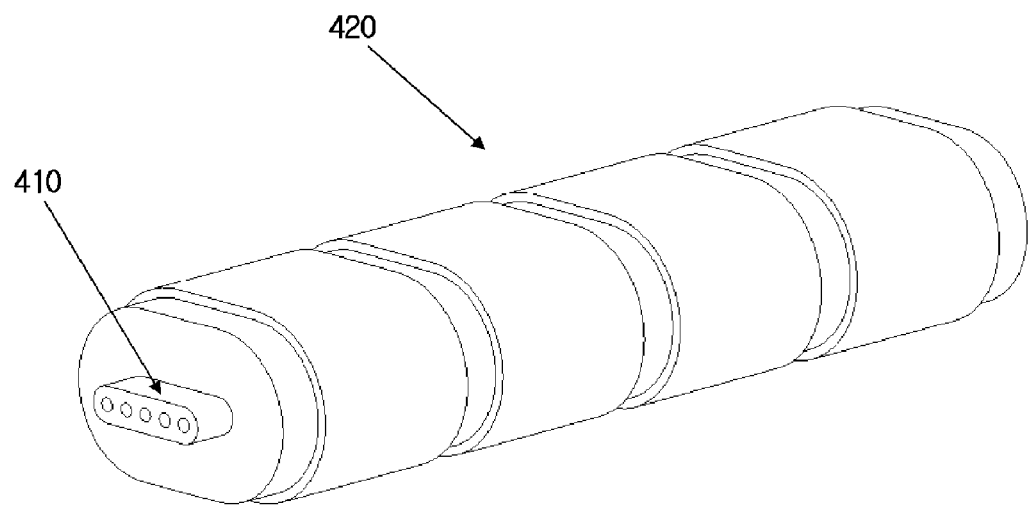

[Fig. 41]
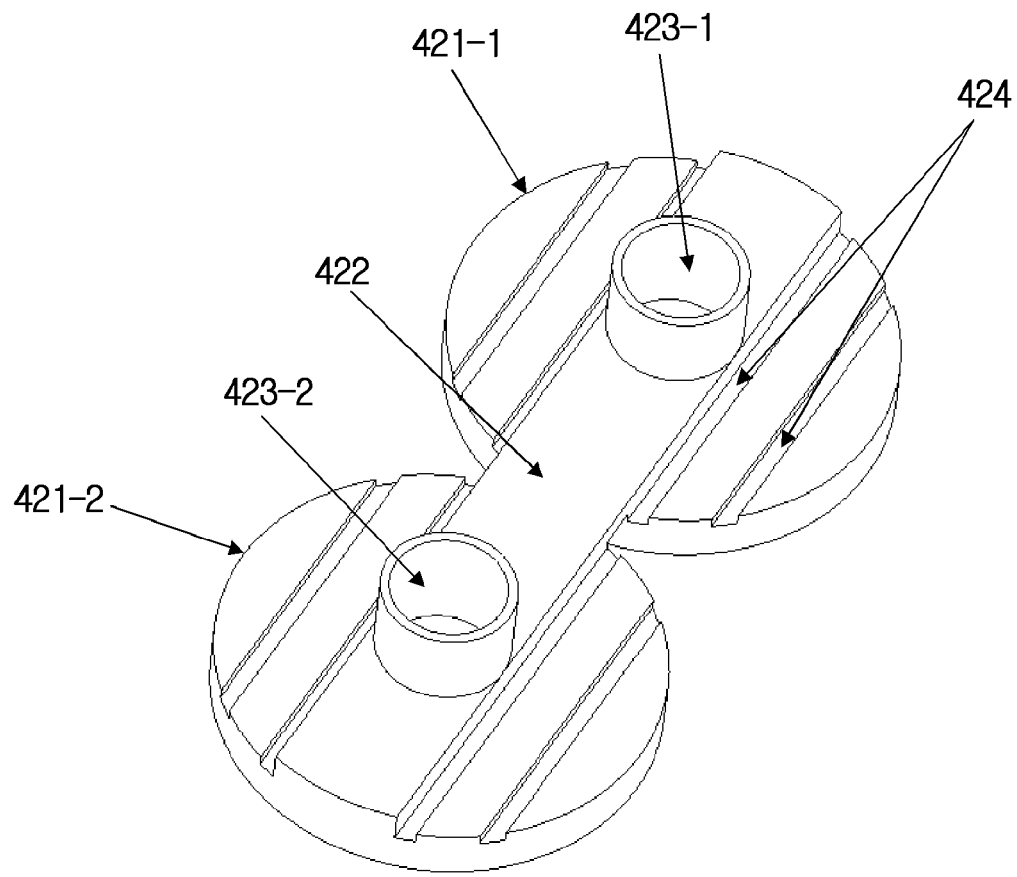
[Fig. 42]
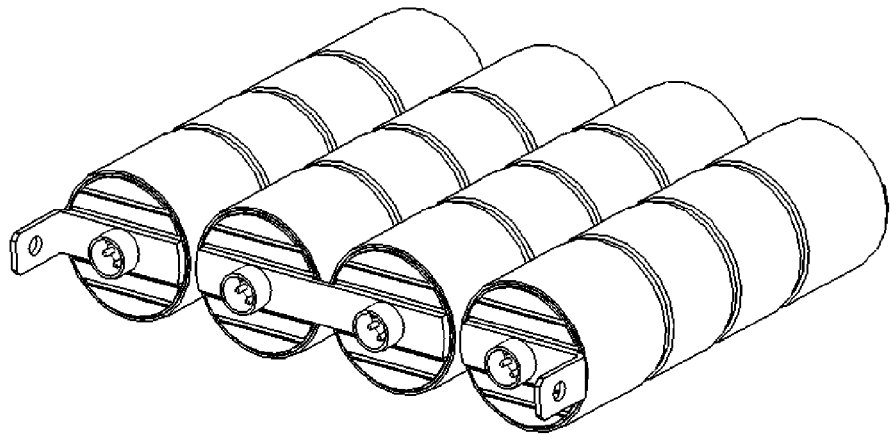

[Fig. 43]
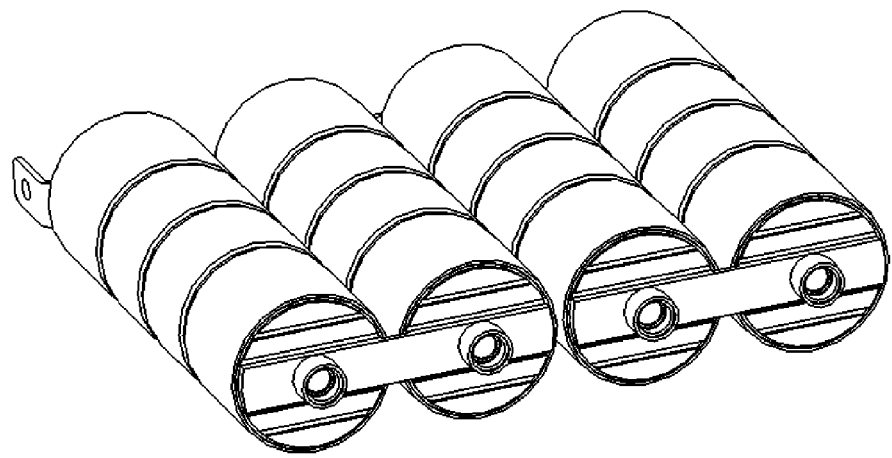
[Fig. 44]
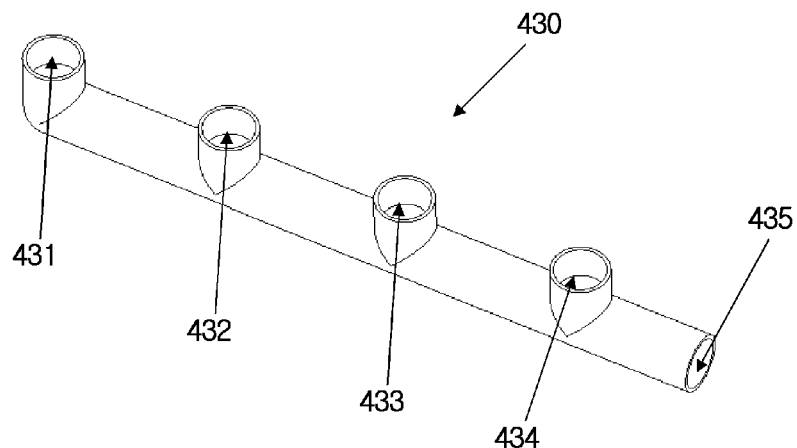
[Fig. 45]
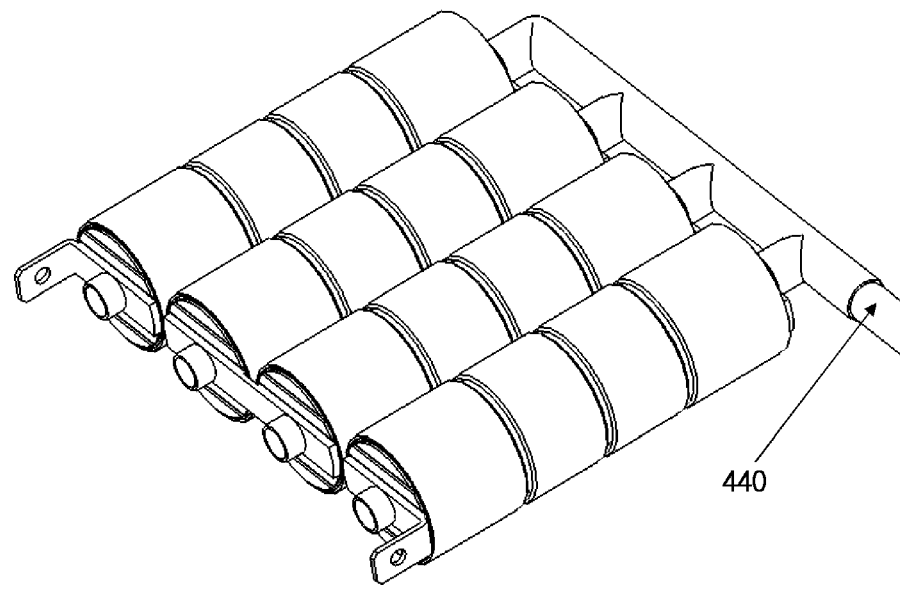

[Fig. 46]
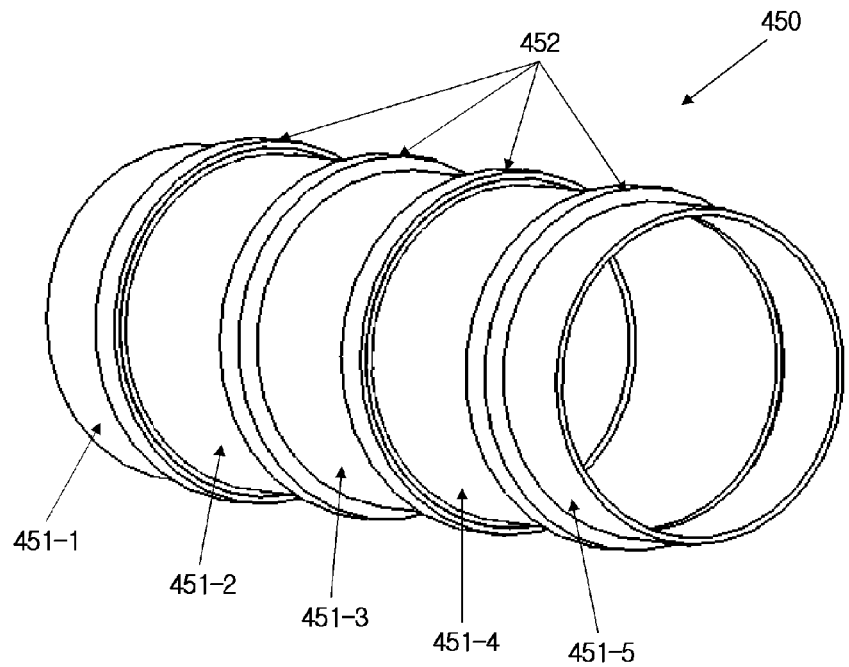
[Fig. 47]
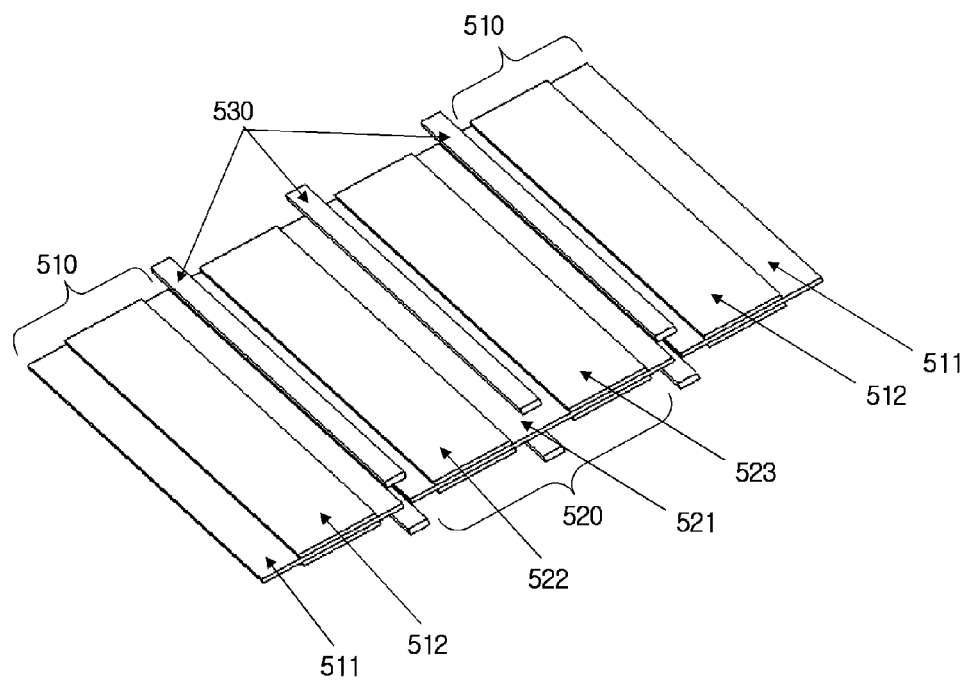

[Fig. 48]
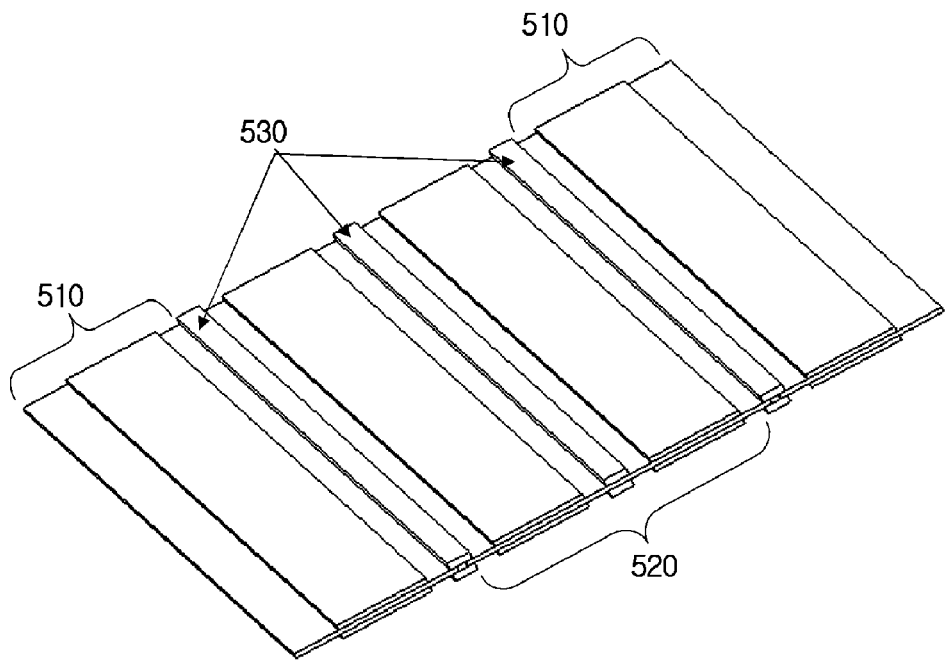
[Fig. 49]
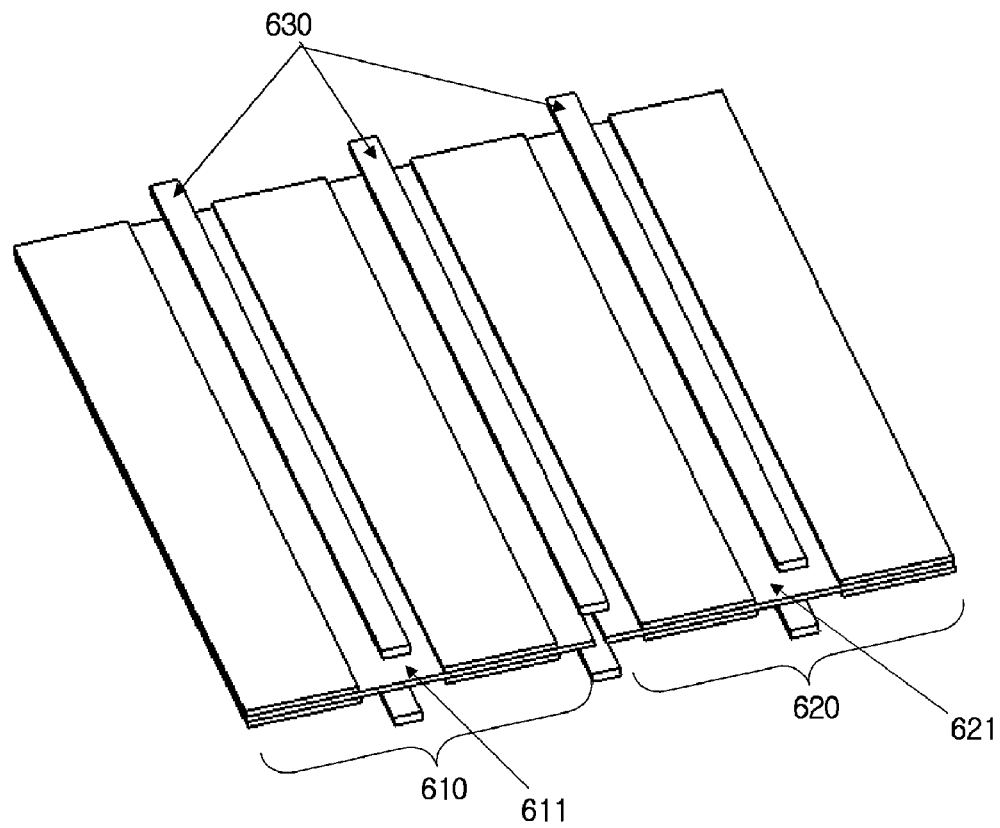

[Fig. 50]
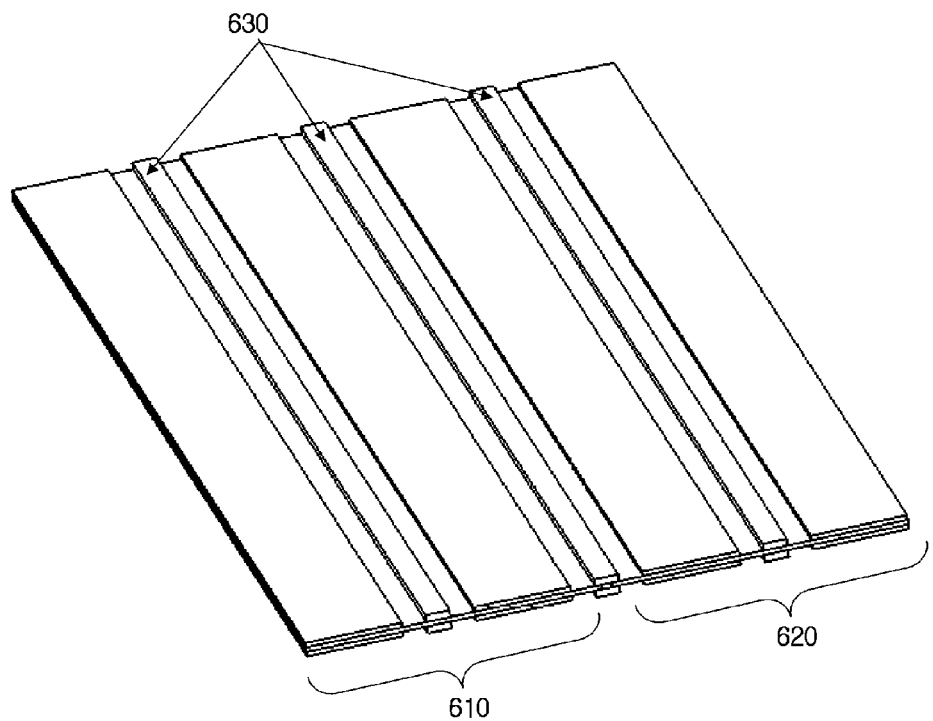
[Fig. 51]
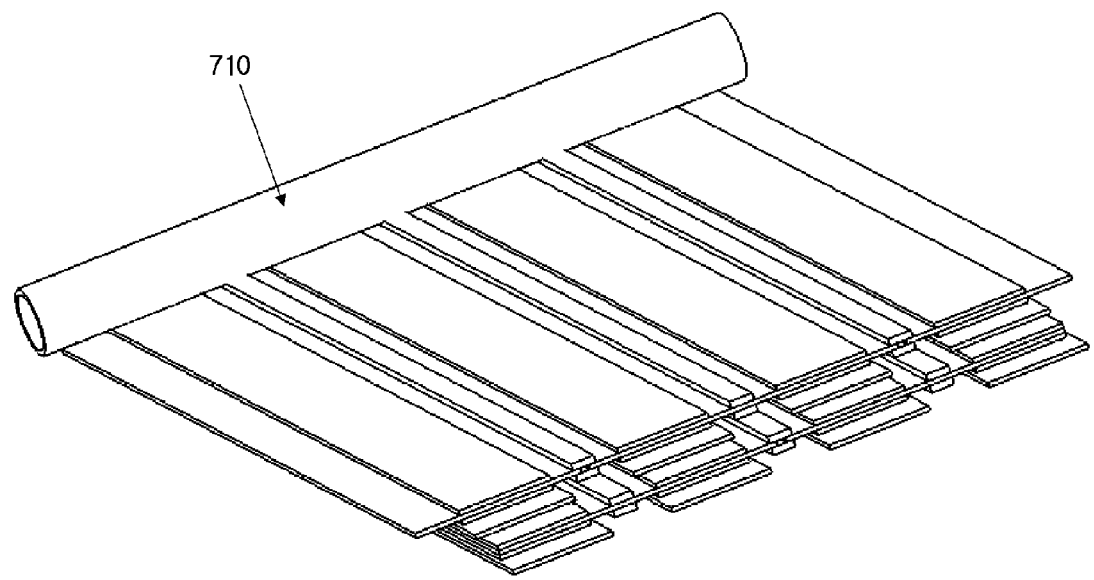

ELECTROCHEMICAL CELL HAVING QUASI-BIPOLAR STRUCTURE

TECHNICAL FIELD

The present disclosure relates to a modularized electrochemical cell having a quasi-bipolar structure, and in particular to, an electrochemical cell having a simple structure and improved reliability and productivity in a way of forming an electrolyte injection hole in a current collector extension part between negative and positive active material layers of a quasi-bipolar electrode, and another electrolyte injection hole a sidewall of a hollow core around which the quasi-bipolar electrode is wound, so as to easily inject a predetermined amount of electrolyte into each unit cell of an electrode assembly through an electrolyte injection port.

BACKGROUND ART

In general, electrochemical cells have a mono polar structure. Such a mono polar electrochemical cell includes a positive electrode composed of a positive active material formed on a current collector and a negative electrode composed of a negative active material formed on another current collector. These electrodes are disposed with opposite polarity sides facing each other, and a separator is inserted between the electrodes to form a unit-cell structure.

FIG. 1 illustrates a mono polar electrochemical cell of the related art.

Referring to FIG. 1, the electrochemical cell 10 of the related art includes a positive electrode 11, a negative electrode 12, a separator 13, an electrolyte 14, terminals 15-1 and 15-2, and a case 16. The illustrated electrochemical cell is the minimum basic operation unit which is called a unit cell.

Electric energy is stored in the positive electrode 11 and the negative electrode 12.

The separator 13 inserted between the positive and negative electrodes 11 and 12 is electrically nonconductive. However, the separator 13 may be omitted if the positive and negative electrodes 11 and 12 can be not in contact with each other without the separator 13. In a recent lithium polymer battery, solid polymer electrolyte is used instead of a separator; however, the solid polymer electrolyte contains a liquid electrolyte, and electrochemical reactions are produced by ions contained in the liquid electrolyte. That is, basically, the lithium battery is not different from a battery using a separator and a liquid electrolyte.

The separator 13 is formed of a material capable of transmitting the electrolyte 14, such as porous polymer, fiber glass mat, and paper.

The operational voltage of such electrochemical unit cells having the above-described structure is only several volts. Among electrochemical cell batteries, a lithium ion battery has a relatively high operational voltage; however, the nominal voltage of the unit cells of the lithium ion battery is also low at about 3.6 Volts.

Therefore, electrochemical cells should be connected in series for being used in application fields such as industrial and vehicle application fields requiring several tens to several hundreds of volts, as shown by unit cells 21, 22, and 23 in FIG. 2.

Since the unit cells 21, 22, and 23 are connected in series, the assembled structure and assembling processes are complicated, and additional parts such as his bars and screws are necessary. Furthermore, the volume, weight, and resistance of the assembled structure are increased. As shown in FIG. 2, his bars are used to connect neighboring unit cells, and screws are used to fix the his bars to the unit cells.

An electrochemical cell 30 having a bipolar structure as shown in FIG. 3 has been developed to address the above-described limitation.

In the electrochemical cell 30 having a bipolar structure, electrodes are configured such that both sides of current collectors 31 have opposite polarities and electrodes having opposite polarities face each other with a separator 32 being disposed therebetween. The lowermost electrode is composed of an active material layer formed on one side of the lowermost current collector 31, and the uppermost electrode is composed of an active material layer formed on one side of the uppermost current collector 31.

In manufacturing electrodes of the bipolar electrochemical cell 30, if positive and negative electrodes are formed on the same material of the current collector 31, a positive active material layer 33 and a negative active material layer 34 are formed on both sides of the current collector 31 having a sheet shape. If positive and negative electrodes have to be formed on different materials of the current collector 31, a complex current collector having a laminated structure formed of different materials is used as the current collector 31. In FIG. 3, reference numeral 35 denotes gaskets, and reference numerals 36 and 37 denote terminals. The gaskets 35 are used as electrolyte sealing and isolating members for sealing unit cells, such that undesired phenomena such as current leakage, side reactions, corrosion caused by the side reactions can be prevented between unit cells.

Generally, a current collector of a positive electrode of a lithium ion battery is formed of aluminum, and a current collector of a negative electrode is formed of copper. In a lithium ion battery having a bipolar structure, current collectors having a multi-layer structure composed of aluminum and copper lamination sheets may be used. In a general electrochemical cell having a bipolar structure, an electrolyte isolation member is installed on an edge portion of an electrode so as to prevent undesired phenomena between unit cells, such as current leakage, side reactions, and corrosion caused by the side reactions. For the same reason, an electrolyte should not be transmitted through a current collector of an electrode in the electrochemical cell having a bipolar structure.

In the bipolar structure, if electrolytes of neighboring unit cells are not securely isolated, current leakage occurs between the unit cells, and the unit cells corrode easily. Therefore, it is very difficult to isolate electrolytes of neighboring unit cells securely for a long time under various operation environments.

Another limitation of a bipolar electrochemical cell is that it is difficult to manufacture a high-capacity bipolar electrochemical cell. The areas of electrodes should be increased to increase the capacity of a bipolar electrochemical cell; however, in this case, the structural strength of the bipolar electrochemical cell is reduced, and it is more difficult to isolate electrolytes of neighboring unit cells and inject electrolyte into the unit cells. Furthermore, it is troublesome to assemble electrodes and separators into an electrochemical cell after electrolyte is filled between the electrodes and the separators.

An electrochemical cell having a quasi-bipolar structure similar to the bipolar structure has been developed.

FIG. 4 is a cross-sectional view illustrating a quasi-bipolar electrochemical cell of the related art.

Referring to FIG. 4, the quasi-bipolar electrochemical cell 40 includes current collectors 41, separators 42, positive active material layers 43, negative active material layers 44 and 45, and gaskets 46.

In the above-described bipolar electrochemical cell, active material layers having opposite polarities are disposed on both sides of a current collector. However, as shown in FIG. 5, a quasi-bipolar electrochemical cell electrode 50 includes a mono polar electrode and a quasi-bipolar electrode. The mono polar electrode includes current collectors 51 and 52, and positive and negative active material layers 53 and 54 respectively disposed on the current collectors 51 and 52 and connected to a terminal. The quasi-bipolar electrode includes a current collector 56, and positive and negative active material layers 57 and 58 disposed on the current collector 56 and spaced apart from each other with a current collector extension part 55 being located therebetween.

The electrodes are disposed with opposite polarities facing each other, and separators are disposed between the electrodes. In the quasi-bipolar structure, the quasi-bipolar electrode is used as opposite electrodes of neighboring unit cells. That is, neighboring unit cells are connected in series to each other through the current collector extension part of the quasi-bipolar electrode. In a bipolar structure, a current flows in a direction perpendicular to electrodes; however, in a quasi-bipolar structure, a current flows in a direction parallel to electrodes, that is, in a direction parallel to current collectors. In a quasi-bipolar electrochemical cell, an electrolyte isolation member, such as a gasket and an adhesive that are formed of a nonconductive material through which electrolyte cannot be transmitted, is disposed on a current collector extension part of a quasi-bipolar electrode located at the center portion of the quasi-bipolar electrode so as to isolate electrolytes of neighboring unit cells. However, if there is no extra electrolyte except for electrolyte at an active material layer of an electrode and a separator, such an electrolyte isolation member is not always necessary. In a sealed recombination lead acid battery, extra electrolyte does not exist at other regions than an active material layer of an electrode and a separator, and although extra electrolyte may exist, the extra electrolyte evaporates by an electrochemical reaction. Therefore, in a certain case, an electrolyte isolation member may be not necessary.

FIG. 5 is a perspective view illustrating an electrode of an electrochemical cell having a quasi-bipolar structure according to the related art.

As shown in FIG. 5, the quasi-bipolar electrochemical cell electrode 50 includes a mono polar electrode and a quasi-bipolar electrode. The mono polar electrode includes current collectors 51 and 52, and positive and negative active material layers 53 and 54 respectively disposed on the current collectors 51 and 52. The quasi-bipolar electrode includes a current collector 56 having a connection region 55, and positive and negative active material layers 57 and 58 symmetrically disposed with respect to the connection region 55.

FIG. 6 is a cross-sectional view illustrating an electrochemical cell having a stacked quasi-bipolar structure in the related art.

As shown in FIG. 6, the electrochemical cell 60 having a stacked quasi-bipolar structure includes negative active material layers 61 and 62, separators 63, positive active material layers 64, current collectors 65, and gaskets 66.

FIG. 7 is a view for explaining voltage variations of an electrochemical cell having a stacked quasi-bipolar structure in the related art.

In FIG. 7, reference numerals 71, 72, 73, and 74 denote current collectors, an electrolyte isolation wall, active material layers, and separators, respectively. The capacitance of one of the active material layers is $2C+\Delta$, and the capacitance of the others is $2C$.

In manufacturing electrodes of an electrochemical cell having a quasi-bipolar structure, if the same material of a current collector is used for positive and negative electrodes, electrodes are formed by a generally used active material forming method using a sheet, mesh, or grid current collector; however, if different current collector materials are used for positive and negative electrodes, after positive and negative electrodes are formed in a manner such that an active material does not exist at edge portions of a current collector, the portions where an active material does not exist may be electrically connected by an electric connecting method such as welding so as to form electrodes. Generally, the surface of a current collector is treated like an etched aluminum foil to increase the surface area of the current collector so as to attach an active material layer to the surface of the current collector more reliably.

In a quasi-bipolar structure, a quasi-bipolar electrode and a mono polar electrode may be wound around a core and connected in series to each other along the longitudinal direction of the core. This structure is advantageous for a high-capacity electrochemical cell; however, since sides of a center cell are not exposed to the outside, improved or modified methods are necessary for the reliability of products and manufacturing efficiency. For example, an electrolyte injection method, an electrical connection method for voltage equalization, an electrolyte isolation method, other manufacturing methods, and a structure simplifying method should be improved.

DISCLOSURE OF INVENTION

Technical Problem

Accordingly, the present disclosure provides an electrochemical cell having a simple structure and improved reliability and productivity in a way of forming an electrolyte injection hole in a current collector extension part between negative and positive active material layers of a quasi-bipolar electrode, and another electrolyte injection hole a sidewall of a hollow core around which the quasi-bipolar electrode is wound, so as to easily inject a predetermined amount of electrolyte into each unit cell of an electrode assembly through an electrolyte injection port.

The present disclosure also provides an electrochemical cell in which electrolyte can be easily isolated by using an electrolyte isolation barrier wall constructed by forming a bead in an electrolyte isolation barrier wall part of a case accommodating a quasi-bipolar electrode assembly.

The present disclosure also provides an electrochemical cell having a simple electric connection structure for equalizing voltages of unit cells.

The present disclosure also provides a quasi-bipolar electrochemical cell that is simple, reliable, easy-to-manufacture, productive, and easy-to-install.

Technical Solution

According to an aspect, there is provided an electrochemical cell including: an electrode including a first current collector, and first positive and negative active material layers disposed at both sides of the first current collector and spaced apart from each other with a current collector extension part being located therebetween, wherein a polarity of the electrode is used as an opposite polarity in a neighboring cell; a hollow core; an electrolyte isolation barrier wall disposed at the current collector extension part of the electrode; a case accommodating an electrode assembly formed by winding at least one electrode including the electrode around the core;

and an electrolyte injection port disposed in a side surface of the case and connected to an inside area of the core, wherein a plurality of first electrolyte injection holes are formed in the current collector extension part of the electrode at predetermined intervals, and one or more second electrolyte injection holes corresponding to the first electrolyte injection holes are formed in a sidewall of the core.

According to another aspect, there is provided an electrochemical cell including: an electrode including a current collector, and positive and negative active material layers disposed at both sides of the current collector and spaced apart from each other with a current collector extension part being located therebetween, wherein a polarity of the electrode is used as an opposite polarity in a neighboring cell; a core; a conductive electrolyte isolation barrier wall disposed at the current collector extension part of the electrode; at least one conductive sheet wound around an electrode assembly formed by winding at least one electrode including the electrode around the core, the conductive sheet being electrically connected to the electrode; and at least one sealing sheet wound around the electrode assembly for sealing the electrode assembly, wherein a portion of the conductive sheet is exposed.

According to another aspect, there is provided an electrochemical cell including: an electrode including a current collector, and positive and negative active material layers disposed at both sides of the current collector and spaced apart from each other with a current collector extension part being located therebetween, wherein a polarity of the electrode is used as an opposite polarity in a neighboring cell; a core; a plurality of cases accommodating electrode assemblies each formed by winding at least one electrode including the electrode around the core; and at least one integral terminal including an electric connection part through which two of the electrode assemblies are connected in series, the integral terminal being used as terminals of the two electrode assemblies.

According to another aspect, there is provided an electrochemical cell including: an electrode including a current collector, and positive and negative active material layers disposed at both sides of the current collector and spaced apart from each other with a current collector extension part being located therebetween, wherein a polarity of the electrode is used as an opposite polarity in a neighboring cell; a core; a plurality of cases accommodating electrode assemblies each formed by winding at least one electrode including the electrode around the core; and a manifold connected to sides of the cases through which the electrode assemblies are electrically connected, wherein the manifold includes a plurality of connection holes connected to the sides of the cases.

According to another aspect, there is provided an electrochemical cell including: an electrode including a current collector, and positive and negative active material layers disposed at both sides of the current collector and spaced apart from each other with a current collector extension part being located therebetween, wherein a polarity of the electrode is used as an opposite polarity in a neighboring cell; a core; and a connection part integrally connecting electrodes, which include the electrode and are wound around the core in the same layer.

Advantageous Effects

In the electrochemical cell of the present disclosure, electrolyte injection holes are formed in a current collector extension part between negative and positive active material layers of a quasi-bipolar electrode and a sidewall of a hollow core around which the quasi-bipolar electrode is wound; an electrolyte isolation barrier wall is disposed at the current collector extension part of the quasi-bipolar electrode; and an electrolyte injection port is formed at a side surface of a case to inject electrolyte through the core. Therefore, a predetermined amount of electrolyte can be easily injected into each unit cell of electrochemical cells connected in series from the outside of the electrochemical cells, and a less pressure is applied to the electrolyte isolation barrier wall because the pressure levels inside the unit cells can be uniformly maintained, so that the electrolyte isolation barrier wall can be easily constructed and electrolyte can be isolated more effectively by the electrolyte isolation barrier wall. In addition, only one safety vent can be disposed at the electrolyte injection port formed at the side surface of the case instead of disposing a plurality of safety vents at the side surface of the case, so that the electrochemical cell can have a simple structure and the number of holes formed in the case can be reduced to minimize electrolyte leakage.

In the electrochemical cell of the present disclosure, a bead may be formed in the case in which an electrode assembly is accommodated to isolate electrolyte easily and prevent current leakage and corrosion.

In the electrochemical cell of the present disclosure, a safety vent having a membrane capable of transmitting gas may be used to seal an electrolyte injection part, and thus the electrochemical cell may have a slim shape.

In the electrochemical cell of the present disclosure, electrolyte injection holes corresponding to unit cells may be formed in the core to easily inject electrolyte into the unit cells and improve electrolyte isolation efficiency.

In the electrochemical cell of the present disclosure, wire holes may be formed in the core, and wires may be connected to the quasi-bipolar electrode to equalize voltages of unit cells and improve the reliability of the electrochemical cell.

In the electrochemical cell of the present disclosure, wire strips may be disposed on the core to easily assemble the electrochemical cell using a conductive adhesive.

In the electrochemical cell of the present disclosure, an electric connection structure for voltage equalization of unit cells can be simplified by attaching a conductive sheet to an electrode assembly.

In the electrochemical cell of the present disclosure, a metal sheet having high heat conductivity may be attached to a current collector of the quasi-bipolar electrode to dissipate heat efficiently.

In the electrochemical cell of the present disclosure, current collectors of quasi-bipolar electrodes may have an integrated strip shape to easily assemble the electrochemical cell.

According to the present disclosure, an easy-to-assemble and simple electrochemical cell structure can be provided by connecting modularized electrochemical cells in series.

According to the present disclosure, a manifold may be connected to modularized electrochemical cells connected in series so as to exhaust gas generated inside the electrochemical cells.

In the electrochemical cell of the present disclosure, a case can be formed by connecting metal tubes using insulation sealing parts so as to simplify an electric connection structure for voltage equalization.

In the electrochemical cell of the present disclosure, a plurality of electrodes can be integrated to easily wind the electrodes around the core.

BRIEF DESCRIPTION OF DRAWINGS

FIG. 1 illustrates an electrochemical cell of the related art.

FIG. 2 illustrates unit cells connected in series to each other in the related art.

FIG. 3 is a cross-sectional view illustrating an electrochemical cell having a bipolar structure in the related art.

FIG. 4 is a cross-sectional view illustrating an electrochemical cell having a quasi-bipolar structure in the related art.

FIG. 5 is a perspective view illustrating an electrode of an electrochemical cell having a quasi-bipolar structure in the related art.

FIG. 6 is a cross-sectional view illustrating an electrochemical cell having a stacked quasi-bipolar structure in the related art.

FIG. 7 is a view for explaining voltage variations of an electrochemical cell having a stacked quasi-bipolar structure in the related art.

FIG. 8 is a perspective view illustrating electrodes of an electrochemical cell having a quasi-bipolar structure according to an exemplary embodiment.

FIG. 9 is a perspective view illustrating a core of an electrochemical cell according to an exemplary embodiment.

FIG. 10 is a perspective view illustrating mono polar and quasi-bipolar electrodes of FIG. 8 wound around the core of FIG. 9.

FIG. 11 is a perspective view illustrating an electrode assembly of an electrochemical cell according to an exemplary embodiment.

FIG. 12 is a cross-sectional view illustrating an electrode assembly of an electrochemical cell according to an exemplary embodiment.

FIG. 13 is an exploded perspective view illustrating the electrochemical assembly of FIG. 11 and a case.

FIG. 14 is a perspective view illustrating the electrode assembly of FIG. 10 coupled with a case.

FIG. 15 is a view illustrating wrapping of the electrode assembly of FIG. 10 with an aluminum sheet.

FIG. 16 is a cross-sectional view illustrating the electrochemical cell of FIG. 14.

FIG. 17 is an enlarged partial sectional view illustrating of the electrochemical cell of FIG. 14.

FIG. 18 is a cross-sectional view illustrating a safety vent used to seal an electrolyte injection port illustrated in FIG. 16.

FIG. 19 is a perspective view illustrating a core of an electrochemical cell according to another exemplary embodiment.

FIG. 20 is a perspective view illustrating a core of an electrochemical cell according to another exemplary embodiment.

FIG. 21 is a perspective view illustrating a first usage state of the core illustrated in FIG. 20.

FIG. 22 is a perspective view illustrating a second usage state of the core illustrated in FIG. 20.

FIG. 23 is an exploded perspective view illustrating electrochemical cell electrodes and the core of FIG. 21 according to an exemplary embodiment.

FIG. 24 is a perspective view illustrating an electrochemical cell manufactured using an assembly of the core and electrodes illustrated in FIG. 23.

FIG. 25 is a cross-sectional view illustrating the electrochemical cell illustrated in FIG. 24.

FIG. 26 is a perspective view for illustrating assembling of an electrode assembly using a conductive adhesive according to an exemplary embodiment.

FIG. 27 is a perspective view illustrating an electrochemical cell manufactured using an electrode assembly assembled through the method illustrated in FIG. 26, according to an exemplary embodiment.

FIG. 28 is a perspective view for illustrating assembling of an electrode assembly using a complex sheet according to an exemplary embodiment.

FIG. 29 is a perspective view illustrating an electrochemical cell manufactured using an electrode assembly assembled through the method illustrated in FIG. 28, according to an exemplary embodiment.

FIG. 30 is a perspective view for illustrating assembling of an electrode assembly using metal strips according to an exemplary embodiment.

FIG. 31 is a perspective view illustrating a quasi-bipolar electrode using a strip type current collector according to an exemplary embodiment.

FIGS. 32 to 35 are sectional views illustrating examples of a strip of a quasi-bipolar electrode of an electrochemical cell according to exemplary embodiments.

FIG. 36 is a perspective view illustrating an aligned state of the quasi-bipolar electrode illustrated in FIG. 32.

FIG. 37 is a top perspective view illustrating a process of winding the electrode of FIG. 32 around a core.

FIG. 38 is a perspective view illustrating the process of winding the electrode of FIG. 32 around the core.

FIG. 39 is a cross-sectional view illustrating the process of winding the electrode of FIG. 32 around the core.

FIG. 40 is a perspective view illustrating an electrode assembly wound around an elliptic core according to an exemplary embodiment.

FIG. 41 is a perspective view illustrating an integral cover of an electrochemical cell according to an exemplary embodiment.

FIG. 42 is a front perspective view illustrating modularized electrochemical cells connected in series by using the integral cover of FIG. 41, according to an exemplary embodiment.

FIG. 43 is a rear perspective view illustrating the modularized electrochemical cells connected in series by using the integral cover of FIG. 41, according to an exemplary embodiment.

FIG. 44 is a perspective view illustrating a manifold configured to be attached to safety vents of modularized electrochemical cells according to an exemplary embodiment.

FIG. 45 is a perspective view illustrating the manifold of FIG. 44 coupled to modularized electrochemical cells according to an exemplary embodiment.

FIG. 46 is a perspective view illustrating a case of an electrochemical cell that is composed of a plurality of metal tubes according to an exemplary embodiment.

FIG. 47 is a view illustrating a dissembled state of integrated mono polar and quasi-bipolar electrodes of an electrochemical cell according to an exemplary embodiment.

FIG. 48 is a view illustrating an assembled state of the integrated mono polar and quasi-bipolar electrodes of an electrochemical cell according to an exemplary embodiment.

FIG. 49 is a view illustrating a dissembled state of integrated quasi-bipolar electrodes of an electrochemical cell according to an exemplary embodiment.

FIG. 50 is a view illustrating an assembled state of the integrated quasi-bipolar electrodes of an electrochemical cell according to an exemplary embodiment.

FIG. 51 is a view illustrating a process of winding integrated electrodes around a core according to an exemplary embodiment.

MODE FOR THE INVENTION

Hereinafter, specific embodiments will be described in detail with reference to the accompanying drawings.

FIG. 8 is a perspective view illustrating electrodes of an electrochemical cell having a quasi-bipolar structure according to an exemplary embodiment.

Referring to FIG. 8, the electrochemical cell 100 of the current embodiment includes a mono polar electrode 110 and a quasi-bipolar electrode 120.

The mono polar electrode 110 includes a current collector 112 and active material layers 111 formed on the current collector 112 and having one polarity.

The quasi-bipolar electrode 120 includes a current collector 124, and positive and negative active material layers 121 and 122 that are formed on the current collector 124 and spaced apart from each other. An electrolyte isolation part 123 is formed at a current collector extension part between the positive and negative active material layers 121 and 122 for installing an electrolyte isolation barrier wall on the electrolyte isolation part 123.

The electrochemical cell 100 of the current embodiment further includes a plurality of electrolyte injection holes 125 formed at the current collector extension part of the quasi-bipolar electrode 120 between the electrolyte isolation part 123 and the negative active material layers 122, and a plurality of electrolyte injection holes 126 formed at the current collector extension part of the quasi-bipolar electrode 120 between the electrolyte isolation part 123 and the positive active material layers 121.

The electrochemical cell 100 of the current embodiment may further include a plurality of electrolyte injection holes 113 formed at a current collector extension part, which is located at an outer side of the active material layers 111 of the mono polar electrode 110 for connection with a terminal.

The mono polar electrode 110 is a part to be connected to an external terminal such that the current collector 112 of the mono polar electrode 110 has a foil or sheet shape for transmitting a current. The active material layers 111 are formed on the top and bottom sides of the current collector 112 and has a positive or negative polarity for storing electricity. The current collector extension part is formed at an outer side of the active material layers for connecting the mono polar electrode to an external terminal. In the case where the active material layers 111 are formed on both sides of the current collector 112, the active material layers 111 formed on both sides of the current collector 112 are configured to have the same polarity and overlap each other. That is, the active material layers 111 have the same width and position.

The current collector 124 of the quasi-bipolar electrode 120 has a foil or sheet shape for transmitting a current to the positive active material layers 121 and the negative active material layers 122. That is, the positive active material layers 121 and the negative active material layers 122 are formed on the top and bottom sides of the current collector 112 for storing electric energy. In the case where active material layers are formed on both sides of the current collector 124, the positive active material layers 121 and the negative active material layers 122 are formed in a manner such that layers of the same polarity are located on opposite sides of the current collector 124. That is, active material layers formed on both sides of the current collector 124 and having the same polarity are configured to have the same width and position. In general, positive and negative active material layers of a quasi-bipolar electrode, and positive and negative active material layers of a mono polar electrode have the same width. The electrolyte injection holes 125 and 126 formed at the quasi-bipolar electrode are used for easily injecting a predetermined amount of electrolyte into each unit cell after the electrochemical cell is assembled.

If the electrochemical cell 100 is an electric double layer capacitor, the current collector 124 may be formed of aluminum, and active carbon powder may be used as positive and negative active materials. In this case, the active carbon powder may be mixed with a binder, a conductive material, and a solvent to form slurry or paste, and the slurry or paste may be directly applied to the current collector 124 to form active material layers. Alternatively, after fabricating an active material sheet, the active material sheet may be bonded to the current collector 124 to form an electrode. In addition, like in the case of other electrochemical cell electrodes, a current collector material having an increased surface area through a predetermined surface treatment, such as an etched aluminum foil, may be used to form the current collector 124 so as to easily attach an active material layer to the current collector 124. In most electric double layer capacitors, electrodes are not distinguished into positive and negative electrodes. However, in a general electrochemical cell, different active materials are used for positive and negative electrodes, and thus, electrodes are distinguished into positive and negative electrodes. Furthermore, different materials can be used for current collectors of positive and negative electrodes. In the case of a lithium ion battery, aluminum and copper are used as materials for the current collector 124. If the current collector 124 is formed of different materials, electrodes may be previously fabricated and then bonded through a predetermined method such as welding to form the quasi-bipolar electrode 120. In this case, a bonding line may be located within the electrolyte isolation part 123.

FIG. 9 is a perspective view illustrating a core of an electrochemical cell according to an exemplary embodiment.

As shown in FIG. 9, the electrochemical cell of the current embodiment includes a core 140 around which the mono polar electrode 110 and the quasi-bipolar electrode 120 illustrated in FIG. 8 can be wound. The core 140 includes a plurality of electrolyte injection holes 141, 142, 143, and 144.

The electrolyte injection holes 141 are correspondingly formed at both sides of a tape 145 such that an electrolyte for a first unit cell can be injected through the electrolyte injection holes 141.

The electrolyte injection holes 142 are correspondingly formed at both sides of a tape 146 such that an electrolyte for a first unit cell can be injected through the electrolyte injection holes 142.

The electrolyte injection holes 143 are correspondingly formed at both sides of a tape 147 such that an electrolyte for a first unit cell can be injected through the electrolyte injection holes 143.

The electrolyte injection holes 144 are correspondingly formed at both sides of a tape 148 such that an electrolyte for a first unit cell can be injected through the electrolyte injection holes 144.

The tapes 145 to 148 are exemplarily used for fixing electrodes to the core 140 when starting to wind the electrodes around the core 140.

The core 140 is formed of a plastic such as polyethylene, polypropylene, polyphenylene sulfide (PPS), and phenol resin, or a metal such as aluminum. The core 140 has a pipe shape. A plurality of holes are formed in the lateral wall of the core 140 to injects electrolyte into unit cells through the holes. The holes are formed along the length direction of the core 140 at positions corresponding to the electrolyte injection holes of the quasi-bipolar electrode 120. The holes of the core 140 are not aligned in a line but are angularly disposed around a center axis of the core 140, so that the holes can be angularly spaced for easily connecting electrolyte injection pipes to the holes for injecting electrolyte to respective unit cells. In the current embodiment, the holes for the respective unit cells are disposed at 90 degrees from each other.

For each of four unit cells, the core 140 has two holes corresponding to two lines of electrolyte injection holes of a quasi-bipolar electrode. Tapes may be attached to the surface of the core 140 or lamination films that can be treated by heat adhesion may be formed on the surface of the core 140 so as to easily fix electrodes to the core 140 when starting to wind the electrodes around the core 140, or the core 140 may be surface-treated to increase an attaching force of an adhesive to the core 140 or may be laminated with a film so as to easily install an electrolyte isolation barrier wall between unit cells. In addition, the surface of the core 140 may be hydrophobic treated so as to prevent the surface of the core 140 from being wet by electrolyte and a cross linkage of electrolyte between the outside and inside of the core 140.

In the current embodiment, four unit cells are connected in series to each other; however, the present invention is not limited thereto.

FIG. 10 is a perspective view illustrating an electrochemical cell having a quasi-bipolar structure in which the mono polar and quasi-bipolar electrodes of FIG. 8 wound around the core of FIG. 9. That is, assembling of an electrochemical cell in which four unit cells are connected in series is illustrated. Mono polar electrodes 110, quasi-bipolar electrodes 120, and separators 114 are arranged for being wound around the core 140. Electrolyte injection holes 113, 125, and 126 of the electrodes, and electrolyte injection holes 141 to 144 of the core 140 are correspondingly arranged with respect to the center axis of the core 140. Owing to this arrangement, after the electrochemical cell is assembled, electrolyte can be easily injected through the electrolyte injection holes.

Neighboring cells are connected in series in a manner such that polarities of the quasi-bipolar electrode 120 are used as opposing polarities in neighboring cells, and the two mono polar electrodes 110 that will be connected to terminals are arranged in a manner such that the mono polar electrode 110 is disposed at a side of the separator 114 to face the active material layer of the quasi-bipolar electrode 120 having an opposing polarity and disposed at the other side of the separator 114. The width of the separators 114 is slightly larger than the width of active material layers attached to current collectors. It is not necessary to align the centers of the electrolyte injection holes of the core 140 with the centers of the electrolyte injection holes of the electrodes for aligning the electrodes with respect to the core 140 but it is necessary to position the electrolyte injection holes of the quasi-bipolar electrodes 120 onto the corresponding electrolyte injection holes formed along the center line of the core 140. That is, only one-dimensional position alignment in the direction of the center axis of the core 140 is sufficient for the electrolyte injection holes. To form an electrolyte isolation barrier wall between unit cells, the electrodes are wound around the core 140 while continuously applying an adhesive 115 to the electrolyte isolation parts 123 of the electrodes. A material through which electrolyte cannot be transmitted is used to form the electrolyte isolation barrier wall, and instead of the adhesive 115, epoxy, paste, liquid sealant, or molten resin can be used. In addition, a strip formed of a thermoplastic resin such as polyethylene or rubber may be used, alone or together with an adhesive, to form the electrolyte isolation barrier wall. While the electrodes are wound around the core 140, the adhesive 115 applied to the electrodes forms electrolyte isolation barrier walls on the surfaces of the electrodes that are already wound around the core 140 to isolate electrolytes of neighboring unit cells. At the same time, electrolyte isolation barrier walls are formed between the core and the electrodes. When strips formed of thermoplastic resin are used to form electrolyte isolation barrier walls, electrodes are heated to a temperature higher than the melting point of the strips after the electrodes are wound around the core, so as to form the electrolyte isolation barrier walls by fusing the strips to current collectors.

By winding the electrodes around the core as described above, an electrode assembly can be formed as shown in FIG. 11.

FIG. 12 is a cross-sectional view taken along the center axis of the core 140 to shown an electrode assembly of an electrochemical cell according to an exemplary embodiment.

Referring to FIG. 12, the thickness of electrolyte isolation barrier walls 116 is exaggerated for clarity. Practically, in the case of an electric double layer capacitor, the thickness of electrodes ranges from about 0.2 mm to about 0.5 mm; the thickness of separators ranges from about 0.5 mm to about 1.0 mm; and the thickness of the electrolyte isolation barrier walls ranges from about 0.5 mm to about 1.0 mm. As well as the electric double layer capacitor, other electrochemical cells in which electrodes are wound have similar dimensions.

An adhesive is applied along exposed electrolyte isolation parts 123 of electrodes of the electrode assembly wound around the core 140, and then the electrode assembly is placed into a case (refer to FIG. 13). For this, the outer diameter of the electrode assembly including the adhesive may be slightly smaller than the inner diameter of the case. Otherwise, when the electrode assembly is inserted into the case, undesired situations, such as sticking of the adhesive to the inner surface of the case, may occur, and thus the assembling process may become difficult. The case has a pipe shape and is made of resin or a metal such as aluminum and stainless steel. Preferably, the case may be made of a metal.

FIG. 13 is an exploded perspective view illustrating the electrochemical assembly of FIG. 11 and a case.

Referring to FIG. 13, covers 150 used as terminals are coupled to both sides of the core 140, and gaskets 151 are coupled to the covers 150 for preventing a short circuit between the covers 150 and a case 160. Then, after aligning the center axis of the case 160 with the center axis of the core 140, an electrode assembly 170 is inserted into the case 160. An injection hole is formed in at least one of the two covers 150 for injecting electrolyte. After the electrode assembly 170 is inserted in the case 160, beads 171 are formed at the adhesive 115 applied to the electrolyte isolation parts 123 of electrodes exposed to the outside of the electrode assembly 170 as shown in FIG. 14, and thus the adhesive 115 applied to the electrolyte isolation parts 123 of the exposed electrodes of the electrode assembly 170 can be pressed by the beads 171. In this way, barrier walls are formed between the electrodes and the case 160 for isolating electrolytes. To form the electrolyte isolation barrier walls, instead of using the adhesive, epoxy, paste, liquid sealant, and molten resin can be used. In addition, a strip formed of rubber or a thermoplastic resin may be used, alone or together with an adhesive, to form the electrolyte isolation barrier walls. The electrolyte isolation barriers walls can be reinforced by inserting the electrode assembly 170 into a heat shrinkable tube to shrink the electrode assembly 170 after applying the adhesive 115 to the electrolyte isolation parts 123 of the electrode assembly 170, and reinserting the electrode assembly 170 into the case 160 made of a metal, and forming the beads 171 at the electrolyte isolation parts 123. Alternatively, instead of using an adhesive to form the electrolyte isolation barrier walls, the electrolyte isolation barrier walls can be formed as follows: the electrode assembly is wrapped with a sheet formed of a thermoplastic resin; the electrode assembly is inserted into the case 160 formed of a metal to form the beads 171 at the electrolyte isolation parts 123 of the electrodes; and the electrode assembly is heated to a temperature equal to or higher than the melting point of the thermoplastic resin to form the electrolyte isolation barrier walls between the beads 171 of the case 160 and the electrolyte isolation parts 123 of the exposed electrodes of the electrode assembly 170.

The case is generally formed of a metal such as aluminum and stainless steel, and for the electrochemical stability, the case may be formed of the same kind of material as that used for forming the current collector. Particularly, in the case where the case is used as a pole of a terminal, the electrochemical stability of the case is important. Alternatively, the case may be formed of a resin.

Besides, other types of cases can be used. For example, after winding separators around portions of the electrode assembly 170 wound around the core 140 except for the exposed electrolyte isolation parts 123 of the electrode assembly 170 or winding protective films such as a polyethylene film or a polypropylene film around the portions of the electrode assembly 170, an adhesive 115 is applied along the exposed electrolyte isolation part 123, and covers 150 are inserted to the core 140 as shown in FIG. 15. Thereafter, an aluminum complex sheet, which is composed of an aluminum sheet 180 and an auxiliary layer laminated on the aluminum sheet 180 for increasing the bonding strength between the aluminum sheet 180 and the adhesive 115 or the gaskets 151, is wound around the electrode assembly 170 and the covers 150. Next, a sheet treatable by heat adhesion, such as a polyethylene sheet, a polypropylene sheet, a polyethylene terephthalate (PET) sheet, or a hot-melt-adhesion complex sheet composed of a plurality of laminated films for improving hot-melt-adhesion, mechanical, and chemical characteristics, is wound around the aluminum complex sheet, and heat is applied for adhesion to the aluminum sheet 180. In this way, a sheet type case can be used. The adhesive 115 applied to the electrolyte isolation parts is pressed by the aluminum sheet 180, and thus barrier walls can be formed between the aluminum sheet 180 and electrodes for isolating electrolyte.

Beside the above-described method, a complex sheet composed of an aluminum sheet 180 and a hot-melt-adhesion sheet such as a polyethylene sheet, polypropylene sheet, and a PET sheet laminated on one or both sides of the aluminum sheet 180 may be used, or an aluminum sheet 180 and a hot-melt-adhesion sheet may be used in an overlapping manner. In the case of an electric double layer capacitor using organic electrolyte, moisture causes undesired electrochemical reactions like in other electrochemical cells using organic electrolyte, a polymer sheet may not be used along without using a metal sheet together because moisture can be transmitted through the polymer sheet although the transmitted amount is small. Instead, a complex sheet composed of a thermoplastic sheet and a metal film such as an aluminum film deposited on the thermoplastic sheet for preventing transmission of moisture may be used. However, in the case of an electrochemical cell using aqueous electrolyte, a polymer sheet can be used alone as a case material.

In the above-described embodiment, an aluminum sheet is exemplified as a metal sheet that can be used to form the case. However, the metal sheet is not limited to the aluminum sheet. In the case of using a metal sheet, the same kind of metal as that used for the current collector may be used.

Alternatively, a heat shrinkable tube may be used for forming the case instead of using a sheet. When a sheet or a heat shrinkable tube is used as the case, metal bands may be wound around junction portions of the case where the covers are bonded or the electrolyte isolation barrier walls are formed so as to reinforce junction portions, or a metal reinforcement tube can be inserted to increase the entire strength of the case or the junction portions of the case.

The method of forming a case by winding a sheet around the electrode assembly is advantageous in terms of weight and size as compared with the case of using a pipe type case. Furthermore, although there can be a gap between the case and the electrode assembly when a pipe type case is used as the case, in the case of using a sheet to form the case, the case and the electrode assembly can be in tight contact with each other so that heat can be easily dissipated to the outside during the operation of the electrochemical cell.

After the electrode assembly is inserted into the case as described above, a laser beam is irradiated into grooves 172 formed in the covers from the outsides of the covers so as to electrically connect extension portions of current collectors of the mono polar electrodes exposed at both sides of the electrode assembly to connection portions (terminals) of the covers by welding. As shown in FIG. 14, according to the present disclosure, an electrolyte injection port 173 is formed at a side of the electrochemical cell for injecting electrolyte through the electrolyte injection port 173.

In the case of an electric double layer capacitor, particularly, an electric double layer capacitor using an organic electrolyte, a drying process is necessary to remove moisture and other impurities before an electrolyte injecting process, like in the case of other electrochemical cells. The process temperature of the drying process varies according to the kinds of active material and other materials, and in the case of the electric double layer capacitor, the process temperature may range from about 70° C. to about 180° C. Therefore, in the case where a sheet or strip formed of a thermosetting epoxy or a thermoplastic resin such as a thermoplastic polypropylene, or a molten resin such as a molten polyethylene is used to form electrolyte isolation barrier walls instead of using an adhesive, although the sheet, strip, or molten resin is not sufficiently adhered to a core, electrodes, and a case during a process of winding the electrodes around the core, the sheet, strip, or molten resin can be sufficiently adhered during the drying process. Therefore, electrolyte isolation barrier walls can be stably formed.

FIG. 16 is a cross-sectional view illustrating the electrochemical cell of FIG. 14, which has a pipe type case and a four-series quasi-bipolar structure.

In the case where an electrochemical cell has an electric double layer capacitor structure, an electrolyte formed of a solvent such as propylene carbonate or acetonitrile and a solute such as tetraethyl ammonium tetrafluoroborate ($E_4NBF_4$) is generally used. Such an electrolyte is injected through the electrolyte injection port 173 and supplied to each cell through the core 140 and electrolyte injection holes. Referring to FIG. 16, barrier walls 174 are formed between unit cells for isolating electrolyte.

FIG. 17 is an enlarged partial sectional view illustrating of the electrochemical cell of FIG. 14. The partial section view of FIG. 17 is taken along the center axis of the electrochemical cell assembled as shown in FIG. 16 to show a second unit cell of the electrochemical cell.

Referring to FIG. 17, a second unit cell 210 includes a core 140, an electrolyte injection hole 142 formed in the core 140, a case 160, a bead 171, a barrier wall 174, electrolyte injection holes 211 formed in quasi-bipolar electrodes, and an electrolyte 212. An electrolyte injection pipe 213 is used to inject electrolyte to two unit cells.

At each unit cell, two holes are formed to inject electrolyte through a sidewall of the core 140. Before injecting electrolyte by connecting the electrolyte injection pipe 213 to a lower hole of the two holes, air is extracted from the inside of the unit cell to reduce the pressure inside the unit cell for injecting electrolyte into the unit cell smoothly. After the pressure inside the unit cell is reduced to a predetermined level, a predetermined amount of electrolyte is injected into the unit cell through the electrolyte injection pipe 213. The electrolyte injected in the unit cell spreads through the electrolyte injection holes 211 formed in the electrodes and permeates between the electrodes and separators 114 as shown in FIG. 17. While the electrolyte is injected, the inside of the unit cell is continuously reduced in pressure through an upper hole formed in the core 140 so as to inject the electrolyte rapidly. Particularly, in the case of an electric double layer capacitor using active carbon, gas adsorbed to active carbon can be discharged through the upper hole of the core 140 while electrolyte is injected, so that the electrolyte can be injected without disturbance by the gas and generation of bubbles in the electrode can be prevented. Electrolyte can be injected into unit cells simultaneously or individually. In this way, electrolyte can be rapidly injected to each unit cell. Upper holes of the electrodes are mainly used to extract gas from the unit cell for reducing the inside pressure of the unit cell. Although holes are not formed in the electrodes, since gaps between the electrodes and the barrier wall can function similarly, one of two holes formed in the unit cell can be omitted. Extension parts of current collectors 113 of mono polar electrodes 110 of unit cells located at both end sides are connected to terminals. If sections of the mono polar electrode and the separator 114 are exposed, a hole may not be formed at the exposed mono polar electrode. Furthermore, although one of two holes formed at the sidewall of the core in one unit cell is omitted, a desired amount of electrolyte can be injected but the injection speed may decrease. In the case where two holes are formed in a unit cell, electrolyte injection and pressure reduction can be simultaneously performed.

Particularly, this may be effective for an electric double layer capacitor having a large capacitance. For example, in the case of a large-capacitance electric double layer capacitor having a capacitance of 5000 F, the length of a narrow electrode reaches about 10 meters although the length can vary according to the width of the electrode. If the viscosity of electrolyte is high, the spreading speed of the electrolyte between an electrode and a separator 114 is reduced in reverse proportion to the width of the electrode, and the electric resistance of the electrode increases as the width of the electrode increases and the length of the electrode decreases because an electric current has to flow a longer distance through a reduced cross section. Therefore, since the length of an electrode increases in proportion to the capacity of a unit cell, the electrolyte injection structure becomes more important as the capacity of a unit cell increases.

According to the present disclosure, all unit cells are connected to each other through holes formed in the core, and thus the pressures of the unit cells are equal. Therefore, an external force caused by a pressure difference is not applied to barrier walls 174 formed between the unit cells to isolate electrolyte so that the barrier walls 174 may be not readily damaged although the barrier walls 174 are structurally strong. Furthermore, although the barrier wall 174 has a fine crevice, electrolyte may not readily flow between neighboring unit cells through the crevice because there is no pressure difference between the unit cells. Therefore, the reliability of the electrochemical cell can be increased, and the electrolyte isolation barrier walls can be easily formed with reduced requirements.

After the electrochemical cell is assembled, gases generated in the electrochemical cell during operations of the electrochemical cell can be discharged to the outside through the holes used to inject electrolyte into the electrochemical cell. In most electrochemical cells, if an over-voltage is applied, gas is rapidly generated by electrochemical reaction, and thus the inside pressure of the electrochemical cell increases rapidly. Therefore, if a device such as a safety vent 220 shown in FIG. 18 is not provided, the electrochemical cell can explode. Generally, the safety vent 220 includes a rupture disk formed of a material such as a thin metal sheet, a thin polymer sheet, and a rubber film, which breaks when the inside pressure of the electrochemical cell reaches a predetermined level or higher to discharge gas to the outside of the electrochemical cell for preventing explosion of the electrochemical cell. Alternatively, a one-way valve may be used instead of the rupture disk. In the current embodiment, since all unit cells are connected to each other through the holes formed in the core 140, it is not necessary to install safety vents at all the unit cells. Explosion of the electrochemical cell may be sufficiently prevented by only one safety vent including a rupture disk or one-way valve installed at an electrolyte injection port of the cover 150. Therefore, the electrochemical cell can have fewer components and a simple structure, and the number of holes of the case can be reduced to prevent leakage of electrolyte.

Alternatively, the safety vent 220 may include membranes 221 as shown in FIG. 18 and be installed at an electrolyte injection port. The membranes 221 may be formed a material having predetermined gas permeability, such as polytetrafluoroethylene (PTFE), polyethylene terephthalate (PET), polyvinylidene chloride (PVDC), polyethylene (PE), and polypropylene (PP).

In the case where the electrochemical cell is an electric double layer capacitor type electrochemical cell, gases such as hydrogen and carbon dioxide are generally generated by electrochemical reactions. When the electric double layer capacitor is normally operated, the amount of generated gas is not large, and the pressure inside the electric double layer capacitor increases gradually to a certain level. The inside pressure of the electric double layer capacitor varies according to the total volume of void spaces inside the electric double layer capacitor. That is, the inside pressure of the electric double layer capacitor is not high when there are many void spaces inside the electric double layer capacitor; however, if the electric double layer capacitor has a large size and heavy weight but few void spaces, the inside pressure of the electric double layer capacitor may be high although the size of the electric double layer capacitor is small, and thus the electric double layer capacitor should have a strong structure. Therefore, gas generated while the electric double layer capacitor is discharged through the membranes 221 so that the inside pressure of the electric double layer capacitor can be maintained at a proper level, and the membranes 221 break to discharge gas to the outside if the inside pressure of the electric double layer capacitor increases rapidly to a critical level due to an over-voltage so that an explosion of the electric double layer capacitor can be prevented. Thus, the size of the electric double layer capacitor can be reduced, and the case of the electric double layer capacitor can be designed in consideration of a lower pressure. For this purpose, the membranes 221 are formed of a material having a high gas permeability for inorganic gases such as hydrogen, oxygen, and carbon dioxide, and a low vapor permeability for electrolyte of the electric double layer capacitor, particularly, low vapor permeability for organic electrolyte. A polymer membrane, particularly, a polymer membrane formed of PTFE, PET, or PVDC, has above-described characteristics. Furthermore, since such a membrane can be treated by heat adhesion, the membrane can be easily installed. In addition, an auxiliary film can be laminated on the membrane to improve the chemical resistance and heat adhesion characteristics of the membrane. A plurality of membranes 221 may be installed as shown in FIG. 18 for adjusting the breakage pressure of the membrane 221, preventing leakage caused by a malfunctioning membrane, and complementing the characteristics of the membranes 221. In addition, a one-way valve or a check valve can be installed outside the membrane to prevent contamination of the membrane and reduce leakage of vaporized electrolyte through the membrane. The above-described safety vent including a membrane can be used in other types of electrochemical cells as well as the electric double layer capacitor type electrochemical cell.

The above-described core 140 has a pipe shape for being used in a four-series quasi-bipolar electrochemical cell; however, the present invention is not limited to the pipe shaped core 140. Other types of cores can be used as explained in the following description.

FIG. 19 is a perspective view illustrating a core of an electrochemical cell according to another exemplary embodiment.

Referring to FIG. 19, like the core 140 illustrated in FIG. 9, an electrochemical cell core 230 of the current embodiment includes electrolyte injection holes 141 for a first unit cell, electrolyte injection holes 142 for a second unit cell, electrolyte injection holes 143 for a third unit cell, and electrolyte injection holes 144 for a fourth unit cell.

The core 230 further includes a plurality of holes 231 to 234 formed in one side thereof. In detail, the hole 231 is used to inject electrolyte to the first unit cell, the hole 232 is used to inject electrolyte to the second unit cell, the hole 233 is used to inject electrolyte to the third unit cell, and the hole 234 is used to inject electrolyte to the fourth unit cell.

As shown in FIG. 19, the holes 231 to 234 are formed in the core 230 along the center axis of the core 230. In this case, electrolyte can be isolated in unit cells more effectively, and injection of the electrolyte to the unit cells is easy. The number of the holes 231 to 234 is equal to the number of unit cells connected in series, and in this case, one side of each hole may be closed. The hole 231 for the first unit cell is connected to the electrolyte injection hole 141 for the first unit cell, and the hole 232 for the second unit cell is connected to the electrolyte injection hole 142 for the second unit cell. The hole 233 for the third unit cell is connected to the electrolyte injection hole 143 for the third unit cell, and the hole 234 for the fourth unit cell is connected to the electrolyte injection hole 144 for the fourth unit cell.

The core 230 having the above-described structure is assembled in a manner such that the holes 231 to 234 are located at the electrolyte injection port 173 formed in the cover 150 of the case 160. That is, the core 230 have the same structure as the core 140 except for the holes 231 to 234 formed in the core 230 along the center axis of the core 230.

If the electrochemical cell 100 includes the core 230, an electrolyte injection pipe can be easily connected to the electrolyte injection holes formed in the core 230 for the respectively unit cells when electrolyte is injected to the unit cells. Alternatively, the four holes 231 to 234 formed in the core 230 along the center axis of the core 230 can function as the electrolyte injection pipe. Since the electrolyte injection holes of the core 230 are separately connected to the holes 231 to 234 formed in the core 230 along the center axis of the core 230 to space the electrolyte injection holes apart from each other, although there is surplus electrolyte that does not permeate between the electrodes and the separators 114 and remains inside the electrochemical cell, electrolyte bridge is difficult to form between unit cells. Therefore, one of the most important tasks in a bipolar electrochemical cell, that is, electrolyte isolation in unit cells, can be carried out more effectively, and thus the reliability of the electrochemical cell can be increased.

In the case where unit cells are connected in series to each other in an electrochemical cell, a connection part is required to electrically connect a voltage equalizing circuit to unit cells when voltages of the unit cells are not uniform. Voltage equalizing is important for unit cells of an electrochemical cell connected in series to prevent errors of the electrochemical cell and increase the lifetime of the electrochemical cell.

Particularly, the possibility of an electrolyte bridge between unit cells that causes current leakage between the unit cells is higher in a bipolar or quasi-bipolar structure that in a mono polar structure, voltage equalizing is more important for a bipolar or quasi-bipolar electrochemical cell. Therefore, as shown in FIG. 20, a core 240 is proposed that allows connection between an external connection wire and electrodes of unit cells for equalizing voltage in a quasi-bipolar electrochemical cell.

FIG. 20 is a perspective view illustrating a core of an electrochemical cell according to another exemplary embodiment.

Referring to FIG. 20, like the core 140 illustrated in FIG. 9, an electrochemical cell core 240 of the current embodiment includes electrolyte injection holes 141 for a first unit cell, electrolyte injection holes 142 for a second unit cell, electrolyte injection holes 143 for a third unit cell, and electrolyte injection holes 144 for a fourth unit cell. In FIG. 20, the electrolyte injection holes 143 and the electrolyte injection holes 144 are not shown.

The core 240 further includes a plurality of holes 241 to 245 formed in one side, and five wire holes formed along the center line of the core 240 at predetermined intervals for electric connection with wires for voltage equalizing. In detail, a terminal wire hole 246, which is configured to be connected to a mono polar electrode or a terminal, and a first unit cell wire hole 247 are shown; however, a second unit cell wire hole, a third unit cell wire hole, and a fourth unit cell wire hole are not shown.

The hole 241, formed in the core 240 in the direction of the center axis of the core 240, is connected to the terminal wire hole 246 formed in the sidewall of the core 240. The hole 241 and the terminal wire hole 246 are used to insert a terminal wire therethrough.

The hole 242, formed in the core 240 in the direction of the center axis of the core 240, is connected to the first unit cell wire hole 247 formed in the sidewall of the core 240. The hole 242 and the first unit cell wire hole 247 are used to insert a first unit cell wire therethrough.

The hole 243, formed in the core 240 in the direction of the center axis of the core 240, is connected to the second unit cell wire hole (not shown) formed in the sidewall of the core 240. The hole 243 and the second unit cell wire hole are used to insert a second unit cell wire therethrough.

The hole 244, formed in the core 240 in the direction of the center axis of the core 240, is connected to the third unit cell wire hole (not shown) formed in the sidewall of the core 240. The hole 244 and the third unit cell wire hole are used to insert a third unit cell wire therethrough.

The hole 245, formed in the core 240 in the direction of the center axis of the core 240, is connected to the fourth unit cell wire hole (not shown) formed in the sidewall of the core 240. The hole 245 and the fourth unit cell wire hole are used to insert a fourth unit cell wire therethrough.

As described above, the core 240 includes the five penetration holes and is used in the above-described four-series quasi-bipolar electrochemical cell.

Five wires made of a metal such aluminum or copper are inserted in the core 240. In some cases, the five wires may be made of different materials. The wires may be made of the same kind of material as that used for forming current collectors of electrodes of the electrochemical cell. In the case of an electric double layer capacitor, aluminum is generally used for forming current collectors, and wires may be made of the same material as the current collectors. For a voltage equalizing operation, five wires are used to measure voltages at three places between unit cells of the four-series quasi-bipolar electrochemical cell and connect wires to a positive mono polar electrode (or a positive terminal) and a negative mono polar electrode (or a negative terminal). Alternatively, only three wires can be used in the case of connecting external wires to the positive and negative terminals for a voltage equalizing operation. The hole 241 formed in the core 240 in the direction of the center axis of the core 240, the terminal wire hole 246 formed in the sidewall of the core 240, the hole 245 formed in the core 240 in the direction of the center axis of the core 240, and the fourth unit cell wire hole (not shown) in the sidewall of the core 240 are connected to mono polar electrodes or terminals connected to the mono polar electrodes. The above-described holes formed in the core 240 are used for injecting electrolyte.

FIG. 21 is a perspective view illustrating a first usage state of the core illustrated in FIG. 20.

As shown in FIG. 21, wires are inserted into the five holes 241 to 245 formed in the core 240 from a side of the core 240 opposite to a side of the core 240 through which electrolyte is injected, so as to prevent the electrolyte injection holes connected to the holes 241 to 245 from being blocked up by the wires. The wires are inserted into the holes 241 to 245 until ends of the wires protrude outward from the core 240 slightly.

In detail, a terminal wire 251 inserted in the core 240 protrudes to the outside of the core 240 through the hole 241 and the terminal wire hole 246 of the core 240.

A first unit cell wire 252 inserted in the core 240 protrudes to the outside of the core 240 through the hole 242 and the terminal wire hole 247 of the core 240.

A second unit cell wire 253 inserted in the core 240 protrudes to the outside of the core 240 through the hole 243 and the terminal wire hole of the core 240.

A third unit cell wire 254 inserted in the core 240 protrudes to the outside of the core 240 through the hole 244 and the terminal wire hole of the core 240.

A fourth unit cell wire 255 inserted in the core 240 protrudes to the outside of the core 240 through the hole 245 and the terminal wire hole of the core 240.

FIG. 22 is a perspective view illustrating a second usage state of the core illustrated in FIG. 20.

Referring to FIG. 22, the terminal wire 251 inserted in the core 240 protrudes to the outside of the core 240 through the hole 241 and the terminal wire hole 246 of the core 240, and a first wire strip 261 is formed using the protruded portion of terminal wire 251.

The first unit cell wire 252 inserted in the core 240 protrudes to the outside of the core 240 through the hole 242 and the terminal wire hole 247 of the core 240, and a second wire strip 262 is formed using the protruded portion of first unit cell wire 252.

The second unit cell wire 253 inserted in the core 240 protrudes to the outside of the core 240 through the hole 243 and the terminal wire hole of the core 240, and a third wire strip 263 is formed using the protruded portion of second unit cell wire 253.

The third unit cell wire 254 inserted in the core 240 protrudes to the outside of the core 240 through the hole 244 and the terminal wire hole of the core 240, and a fourth wire strip 264 is formed using the protruded portion of third unit cell wire 254.

The fourth unit cell wire 255 inserted in the core 240 protrudes to the outside of the core 240 through the hole 245 and the terminal wire hole of the core 240, and a fifth wire strip 265 is formed using the protruded portion of fourth unit cell wire 255.

The first to fifth wire strips 261 to 265 are spaced at regular intervals and wound around the core 240.

The portions of the wires 251 to 255 protruded to the outside of the core 240 may be formed into strip shape to form the wire strips 261 to 265, and the wire strips 261 to 265 may be wound around the core 240 directly or after applying a resin, adhesive, or tape to the surface of the core 240. Alternatively, the protruded portions of the wires 251 to 255 may be left as they are. Alternatively, five strips may be inserted through the holes 241 to 245 instead of inserting the wires 251 to 255. Alternatively, instead of forming the protruded portions of the wires 251 to 255 into wire strips, additional strips may be wound and electrically connected to the wires 251 to 255 by welding. Referring to FIG. 22, the five wires protruding in the center axis direction of the core 240 are cut to the same length. The five wires are disposed in the holes 241 to 245 formed in the core 240 in the center axis direction of the core 240 and are protruded through the holes 246 and 247 formed in the sidewall of the core 240, and the protruded portions of the five wires are covered with a material such as an adhesion, a hot melt, a melt thermoplastic resin, or epoxy to block crevices so that when electrolyte is injected, the holes 241 to 245 formed in the center axis direction of the core 240 can be used as electrolyte injection pipes. Therefore, electrolyte can be injected more easily, and electrolyte can be isolated in unit cells more effectively. In addition, wires coated with a thermoplastic resin such as polyethylene. In this case, the wires can be fixed to holes in which the wires are inserted by heating the wires to a temperature equal to or higher than the melting point of the thermoplastic resin during a drying process. This may be useful as an insulating method when a metal core is used. Therefore, electrolyte can be injected in the same manner as in the case of using the above-described core 230.

FIG. 23 is an exploded perspective view illustrating electrochemical cell electrodes and the core of FIG. 21 according to an exemplary embodiment.

Referring to FIG. 23, reference numerals 271, 272, and 273 denote welding points at which the electrodes and wires are welded when the electrodes are wound around the core. Instead of welding, other electrical connection means such as conductive adhesives can be used.

After the core is prepared as shown in FIG. 21, the electrodes are wound around the core in a manner such that electrolyte isolation parts of quasi-bipolar electrodes and current collector extension parts of mono polar electrodes are connected to corresponding wires protruding from the surface of the core by a predetermined method, such as welding. The next procedures are the same as those described above.

In the case of the core illustrated in FIG. 22 around which wire strips are wound, electrodes can be wound around the core in the same manner as that illustrated in FIG. 10 except for the following. In the electrochemical cell of FIG. 10, adhesive, epoxy, or thermoplastic strips are used to form electrolyte isolation barrier walls between unit cells; however, when electrodes are wound around the core of FIG. 22, a conductive adhesive containing a conductive material such as graphite powder is applied to at least a portion of the core where winding of electrodes starts to electrically connect the electrodes with the wire strips, and the same kind of adhesive but not including a conductive material is applied to the remaining portion of the core. Alternatively, a conductive adhesive can be wholly used when electrodes are wound around the core. In this case, the conductive adhesive connects the wire strips used for obtaining uniform voltage to the electrodes electrically and functions as electrolyte isolation barrier walls between unit cells. Particularly, in the case where a conductive adhesive is used to connect wire strips and electrodes electrically, the contract area between the wire strips and the electrodes can be increased although the thickness of the conductive adhesive between the wire strips and the electrode is small, and thus the contact resistance between the wire strips and the electrodes can be decreased. Alternatively, the wire strips and the electrodes can be electrically connected using other methods such as welding. In the case where means such as a conductive adhesive is used to electrically connect the wire strips and electrodes, the wire strips can be effectively protected from exposure to electrolyte which causes corrosion of the wire strips. In addition, the wire strips can be made of a material selected from a wide range of materials.

As described above, when the electrodes are wound around the core, a conductive adhesive is used to form electrolyte isolation barrier walls between unit cells so as to electrically connect the electrodes with the voltage equalizing wire strips. In this case, additional current passages can be formed in the electrode assembly by the conductive adhesive layers in the radial directions of the core, and thus current passages in the electrodes can be shortened and the resistance of the electrodes can be reduced. Therefore, unit cells can be individually charged and discharged via a larger current flow for voltage equalization, and during these charge and discharge operations, heat generation can be reduced. Particularly, this method is more effective for narrow and long electrodes because the resistance of current collectors of the narrow and long electrodes is great.

FIG. 24 is a perspective view illustrating an electrochemical cell manufactured using an assembly of the core and electrodes illustrated in FIG. 23.

The electrochemical cell of FIG. 24 is manufactured using the assembly of the core and electrodes illustrated in FIG. 23 as follows. A sealant bushing 281, which is formed of a thermoplastic resin such as polyethylene and has the same outer diameter as that of the core and five holes having a diameter corresponding to the diameter of the five wires protruding in the center-axis direction of the core, is coupled to the five wires, and then covers are coupled to the both sides of the core. Thereafter, an adhesive is applied around the exposed electrodes wound around the core, and the core-electrode assembly is inserted into a pipe-shaped case. Beads are formed in the case at portions corresponding to the electrolyte isolation barrier walls so as to bring the adhesive applied to the exposed electrodes into tight contact with the case. After electrolyte isolation barrier walls are formed between unit cells in this way, laser is irradiated to the outer side of the covers that are used as terminals to weld the terminals to current collectors, and a material such as an adhesive, holt melt, and epoxy is applied to the bushing 281 through which the five voltage equalizing wires 282 are protruded so as to seal the bushing 281 more securely. The five voltage equalizing wires 282 protruded outward from the electrochemical cell may be used as connector pins, and connector contacts or soldering pins may be attached to end portions of the wires 282. By this, the wires 282 can be conveniently used as connectors, or electrical connection to the wires 282 by soldering can be easily made. It will easily understood that installation of detecting means such as a temperature sensor and connection of the detection means to the outside as well as electric connection to the inside of the quasi-bipolar electrochemical cell for voltage equalization can be easily made by the above-described method. The voltage equalizing wires 282 may be the same as the wires 251 to 255 illustrated in FIGS. 21 and 22.

FIG. 25 is a cross-sectional view illustrating the electrochemical cell illustrated in FIG. 24.

As shown in FIG. 25, the electrochemical cell of the current embodiment includes a wire 290-1, a bushing 290-2, a case 290-3, beads 290-4, a wire strip 290-5, electrolyte injection holes 290-6, barrier walls 290-7, a core 290-8, covers 290-9, and a safety vent 290-10.

The wire 290-1 is one of the wires 251 to 255 illustrated in FIGS. 21 and 22.

The bushing 290-2 is substantially the same as the bushing 281 illustrated in FIG. 24.

The case 290-3 is substantially the same as the case 160 illustrated in FIG. 13.

Beads 290-4 are substantially the same as the beads 171 illustrated in FIG. 14.

The wire strip 290-5 is one of the first to fifth wire strips 261 to 265 illustrated in FIG. 22.

The electrolyte injection holes 290-6 are some of the electrolyte injection holes 141 to 144 illustrated in FIG. 9.

The barrier walls 290-7 are substantially the same as the barrier walls 116 illustrated in FIG. 12.

The core 290-8 is substantially the same as the core 240 illustrated in FIG. 20.

The covers 290-9 are substantially the same as the covers 150 illustrated in FIG. 13.

The safety vent 290-10 is substantially the same as the safety vent 220 illustrated in FIG. 18.

In the electrochemical cell illustrated in FIG. 25, five axial holes are formed in the core 290-8 around which electrodes are wound, and the wire 290-1 is connected to an electrode through the holes for equalizing voltage. An end of the wire 290-1 is formed in a strip shape and connected to the electrode using a conductive adhesive, and the barrier walls 290-7 are formed using the conductive adhesive. In this way, the electrochemical cell illustrated 25 has a four-series quasi-bipolar structure.

Electrical connection to an electrode of each unit cell of a four-series quasi-bipolar electrochemical cell can be made for voltage equalization by using another method as follows. While quasi-bipolar electrodes, mono polar electrodes, and separators are wound around a core, electrolyte isolation barrier walls are formed at electrolyte isolation barrier wall installation parts of current collector extension parts of the quasi-bipolar electrodes. After forming an electrode assembly in this way, a conductive adhesive is applied around the electrolyte isolation barrier wall installation parts of the quasi-bipolar electrodes that are exposed to the outside, and a plurality of sheets including a conductive sheet such as a metal sheet are wound around the electrode assembly to form a case.

FIG. 26 is a perspective view for illustrating assembling of an electrode assembly using a conductive adhesive according to an exemplary embodiment.

In FIG. 26, reference numeral 310-1 denotes a conductive adhesive, reference numeral 310-2 denotes complex sheets including metal sheets, and reference numeral 310-3 denotes exposed portions of the metal sheets of the complex sheets 310-2.

As shown in FIG. 26, the complex sheets 310-2 is formed by laminating thermoplastic films, which can be treated by heat adhesion, on both sides of a metal sheet, and the width of the complex sheets 310-2 is smaller than the length of unit cells. Before using the complex sheets 310-2, the polymer films formed on center portions of three of the complex sheets 310-2 are removed to expose the metal sheets of the three complex sheets 310-2 so that the exposed metal sheets can adhere to the conductive adhesive 310-1 applied around the electrode assembly. The three complex sheets 310-2 are used as electric connection parts to electrodes of the electrode assembly for the purpose of voltage equalization. Five complex sheets 310-2 including the three complex sheets 310-2, and four complex sheets 310-2 disposed on the outside the five complex sheets 310-2 between the five complex sheets 310-2 are used together. That is, the complex sheets 310-2 are wound around the electrode assembly together and are sealed by heat adhesion.

FIG. 27 is a perspective view illustrating an electrode assembly assembled through the method illustrated in FIG. 26, according to an exemplary embodiment.

In FIG. 27, reference numeral 320 denotes electric connection portions formed by partially exposing metal sheets.

As shown in FIG. 27, exposed portions of the three complex sheets 310-2 connected to electrodes of unit cells through the conductive adhesive 310-1 are partially stripped, or the three complex sheets 310-2 are partially stripped and wound around the electrode assembly to form the connection portions 320. Therefore, electric connection to electrodes of unit cells for voltage equalization is possible by connecting wires to the connection portions 320 using a method such as welding. That is, it is not necessary to form holes in the case of the electrode assembly for making such electric connection.

FIG. 28 is a perspective view for illustrating assembling of an electrode assembly using a complex sheet according to an exemplary embodiment.

As shown in FIG. 28, the electrochemical cell of the current embodiment does not include the outer four complex sheets 310-2 of the complex sheets 310-2 illustrated in FIG. 26 but includes a single complex sheet 330-2 having three holes 330-1.

In FIG. 28, reference numeral 330-3 denotes exposed portions of metal sheets, and reference numeral 330-1 denotes a conductive adhesive. The conductive adhesive 330-1 is substantially the same as the conductive adhesive 310-1 illustrated in FIG. 26.

FIG. 29 is a perspective view illustrating an electrode assembly assembled by the method illustrated in FIG. 28, according to an exemplary embodiment.

In FIG. 29, reference numeral 340 denotes electric connection portions where metal sheets of a complex sheet wound around the electrode assembly are exposed.

After winding the complex sheet around the electrode assembly in the same manner as that illustrated in FIG. 28, outer polymer films of three complex sheets 330-2 wound inside a complex sheet 330-2 having three holes 330-1 are partially removed to form the electric connection portions 340. Alternatively, the three holes 330-1 of the complex sheet 330-2 may be omitted by extending the inside three complex sheets to expose ends of the three complex sheets to the outside.

Alternatively, metal sheets may be used instead of the three complex sheets to which a conductive adhesive is applied.

In the embodiment, the conductive adhesive is applied to exposed electrolyte isolation barrier wall installation parts of the quasi-bipolar electrodes as electrolyte isolation barrier walls and electric connection parts to the electrodes.

In the embodiment, the metal sheets of the complex sheet wound inside the electrode assembly are connected to the electrodes through the conductive adhesive, so as to form electric connection parts at the outer side of the electrochemical cell. Parts of the complex sheet except for the metal sheets are used for electric insulation and sealing. That is, an adhesive material such as a heat adhesion film is used for insulation and sealing. The complex sheet wound around the outside of the electrode assembly seals the electrode assembly. In the case where organic electrolyte is included in the electrochemical cell, the outer complex sheet may include a metal sheet or coated with a metal film to prevent permeation of moisture into the electrochemical cell. That is, such a requirement can be satisfied by providing insulation and sealing means such as a heat adhesion film on an inner or outer side of the electrochemical cell. Alternatively, instead of winding a complex sheet around the electrode assembly, an inner sheet, a heat adhesion sheet, and an outer sheet may be wound around the electrode assembly.

The metal sheets may be formed of the same kind of or similar material that is used to form current collectors for improving electrochemical stability. However, in the case where the same kind of material cannot be used for current collectors of positive and negative electrodes or the metal sheet is chemically or electrochemically unstable, the metal sheet can be protected from electrolyte by sealing the metal sheet with a protective sheet and exposing only a portion of the metal sheet to connect the exposed portion to an electrolyte isolation barrier wall including an adhesive material. Alternatively, as described above, other conductive sheets may be used instead of the metal sheet.

In the case where the case of the electrochemical cell is formed of sheets as explained above, the structural strength of the electrochemical cell or junction parts of the electrochemical cell can be improved by winding a reinforcement part such as a metal band around covers attached to the case or around an outer portion of the case in which an electrolyte isolation barrier wall is located, or by using an reinforcing tube insertion formed of a reinforcing material such as a metal.

Alternatively, a metal case may be used to allow electric connection for the purposes of voltage detection and equalization of unit cells.

FIG. 46 is a perspective view illustrating a case of an electrochemical cell that is composed of a plurality of metal tubes according to an exemplary embodiment.

As shown in FIG. 46, in the current embodiment, the electrochemical cell case 450 is formed by connecting a plurality of metal tubes 451-1 to 451-5. The metal tubes 451-1 to 451-5 are connect to each other using insulation sealing parts 452.

In the case 450, the metal tubes 451-1 to 451-5 are connected by the insulation sealing parts 452 using a method such as seaming or hemming. Thus, the metal tubes 451-1 to 451-5 can be electrically connected to each other.

Instead of applying an adhesive around portions of the electrode assembly of FIG. 13 where electrolyte isolation barrier walls are formed, a conductive adhesive is applied, and after the electrode assembly is inserted into the case, beads 171 are formed on portions of the case to form the conductive adhesive as conductive electrolyte isolation barrier walls between the beads 171 and current collector extension parts of quasi-bipolar electrodes. In the same manner, the metal tubes of the case 450 can be electrically connected to the current collector extension parts of the quasi-bipolar electrodes by inserting the electrode assembly into the case 450 and forming beads on the case 450. Therefore, voltage equalization and detection are possible by connecting a voltage equalizing device to the metal tubes using electric connection means.

In a method of using a case as electric connection means for voltage equalization, when an electrode assembly is formed by winding quasi-bipolar electrodes, mono polar electrodes, and separators around a core and forming electrolyte isolation barrier walls at electrolyte isolation barrier wall installation parts of current collector extension parts of the quasi-bipolar electrodes, the electrolyte isolation barrier walls may be conductive or nonconductive. In the case where the electrolyte isolation barrier walls are conductive, during a voltage equalization operation, a current can flow in the electrode assembly in the radial directions of the electrode assembly as well as the length direction of electrodes. Therefore, electric resistance can be reduced, and thermal conductivity can be increased, so that the electrochemical cell can be easily cooled.

Instead of using a conductive adhesive alone, the conductive adhesive can be applied to both sides of metal strips, and the metal strips can be wound around a core together with electrodes to form an electrode assembly as shown in FIG. 30.

FIG. 30 is a perspective view for illustrating assembling of an electrode assembly using metal strips according to an exemplary embodiment.

In FIG. 30, mono polar electrodes 350-1 are substantially the same as the mono polar electrode 110 illustrated in FIG. 8.

A core 350-2 is substantially the same as the core illustrated in FIG. 22.

Wire strips 350-2 are some of the wire strips 261 to 265 illustrated in FIG. 22.

Metal strips 350-4 may be attached to the electrolyte isolation parts 123 illustrated in FIG. 8 using an adhesive.

Quasi-bipolar electrodes 350-5 are substantially the same as the quasi-bipolar electrode 120 illustrated in FIG. 8.

Separators 350-6 are substantially the same as the separators 114 illustrated in FIG. 10.

If the electrode assembly is assembled as shown in FIG. 30, electrolyte isolation barrier walls are formed by the metal strips 350-4 and a conductive adhesive between unit cells. In this case, the metal strips may be formed of the same kind of metal as that used for forming current collectors. If the electrode assembly is an electric double layer capacitor, the metal strips may be formed of aluminum. If the metal strips 350-4 are used as barrier walls, the resistance of electrodes can be reduced during a voltage equalization operation, and heat can be easily transferred from the electrodes to the outside through the metal strips 350-4 so that the temperature distribution of the electrochemical cell can be uniformly maintained during operations of the electrochemical cell. Alternatively, a conductive resin or rubber including carbon fiber filler may be used instead of the metal strips 350-4.

FIG. 31 is a perspective view illustrating a quasi-bipolar electrode using a strip type current collector according to an exemplary embodiment.

As shown in FIG. 31, in the current embodiment, the quasi-bipolar electrode 360 for an electrochemical cell includes a strip type current collector 361. The center portion of the strip type current collector 361 is thicker than other portions where positive active material layers 362 and negative active material layers 363 are disposed. The strip type current collector 361 may be used instead of the metal strip illustrated in FIG. 30.

The positive active material layers 362 are substantially the same as the positive active material layers 121 illustrated in FIG. 8, and the negative active material layers 363 are substantially the same as the negative active material layers 122 illustrated in FIG. 8.

If the quasi-bipolar electrode 360 is cut into two along its centerline, two mono polar electrodes can be obtained.

In the current embodiment, since the electrode □□□ includes a single current collector 361, the electrode can be easily wound as compared with an electrode including a plurality of separate metal strips, and the current collector 361 can be easily connected to a terminal.

FIGS. 32 to 35 are sectional views illustrating examples of a strip of a quasi-bipolar electrode of an electrochemical cell according to exemplary embodiments.

As shown in FIGS. 32 to 35, various shapes of strips formed of a metal, a resin, or a conductive resin can be used to easily attach the strip to a part of an electrode, at which an electrolyte isolation barrier wall is to be formed, by using a conductive or non-conductive adhesive or a molten resin.

A quasi-bipolar electrode illustrated in FIG. 32 includes a strip 372 disposed on the top surface of a current collector 371 and having a groove, and a strip 373 disposed on the bottom surface of the strip 372 and having a protrusion. That is, the strips 372 and 373 face each other with the current collector 371 being disposed therebetween.

A quasi-bipolar electrode illustrated in FIG. 33 includes a strip 374 disposed on the top surface of a current collector 371 and having a groove.

A quasi-bipolar electrode illustrated in FIG. 34 includes a strip 375 disposed on the top surface of a current collector 371 and having a protrusion.

A quasi-bipolar electrode illustrated in FIG. 35 includes a strip 376 disposed on the top surface of a current collector 371 and having a rectangular cross-sectional shape.

The strips 371 are substantially the same as the current collector 124 illustrated in FIG. 8. The strips 372 to 376 are substantially the same as the metal strips 350-4 illustrated in FIG. 30 except that the strips 372 to 376 can be formed of a metal, a resin, or a conductive resin.

Such strips 372 to 376 can be used for a mono polar electrode as well as a quasi-bipolar electrode. In this case, for example, the strips 372 to 376 may be disposed at the extension part of the current collector 112 of the mono polar electrode 110 illustrated in FIG. 8.

FIG. 36 is a perspective view illustrating an aligned state of the quasi-bipolar electrode illustrated in FIG. 32. When the strips 372 and 373 attached to the quasi-bipolar electrode are wound around a core together with the quasi-bipolar electrode, the aligned state of a guide roller used to align the electrode is illustrated.

As shown in FIG. 36, to effectively isolate electrolyte using a barrier wall formed by the strips 372 and 373 attached to the electrode, a conductive or nonconductive adhesive or a molten resin is applied to the strips 372 and 373 while the electrode is wound around the core so that the strip 372 attached to the top surface of the current collector 371 and the strip 373 attached to the bottom surface of the current collector 371 can be adhered.

FIG. 37 is a top perspective view illustrating a process of winding the electrode of FIG. 32 around a core.

As shown in FIG. 37, guide rollers 390-1 are engaged with strips 372 attached to the top surface of a current collector 371. Therefore, the electrode illustrated FIG. 32 can be wound around the core in a state where the electrode is aligned with respect to the center axis of the core by the guide rollers 390-1. In an electrochemical cell having a quasi-bipolar structure, a plurality of electrodes are wound around a core, and thus complex, large, and expensive equipment may be necessary to adjust the positions of the electrodes to maintain aligned states of the electrodes during an electrode assembly manufacturing process. However, according to the above-described embodiment, the positions of electrodes can be simply and precisely aligned during an electrode assembly manufacturing process. Therefore, the electrode assembly process can be performed more easily and precisely, and errors caused by misaligned electrodes can be prevented.

FIG. 38 is a perspective view illustrating the process of winding the electrode of FIG. 32 around the core.

As shown in FIG. 38, the guide rollers 390-1 are engaged with the strips 372 attached to the top surface of the current collector 371, and guide rollers 390-2 are engaged with guide rollers 373 applied to the bottom surface of the current collector 371.

FIG. 39 is a cross-sectional view illustrating the process of winding the electrode of FIG. 32 around the core.

FIG. 40 is a perspective view illustrating an electrode assembly wound around an elliptic core according to an exemplary embodiment.

As shown in FIG. 40, in the present invention, the shape of a core is not limited to a cylindrical shape; for example, the electrochemical cell of the present invention can include an elliptic core 410. An electrode assembly 420 wound around the elliptic core 410 has an elliptic shape. Besides, cores having various shapes can be used.

In the previous descriptions, modularization of an electrochemical cell having a quasi-bipolar structure such as electric double layer capacitor is explained; however, there is a limit on the number of series unit cells that can be modularized. That is, it is practically difficult to modularize several tens or hundreds of unit cells in series by using a quasi-bipolar structure. Therefore, it is necessary to connect a modularized electrochemical cell having a quasi-bipolar structure to the outside like the case of a mono polar electrode. In the following description, an explanation will be given on a method of connecting modularized quasi-bipolar electrochemical cells in series.

Generally, mono polar electrochemical cells are connected in series by joining series connection parts such as his bars using screws, resist welding, laser welding, or soldering. Modularized quasi-bipolar electrochemical cells can be connected in the same manner. However, other series connection methods are necessary to make use of the advantageous low-resistance property of the quasi-bipolar structure and ensure high reliability.

Therefore, when a modularized quasi-bipolar electrochemical cell is manufactured by winding electrodes around a core, as shown in FIG. 41, two integral covers 421-1 and 421-2 are used as a terminal. The two covers 421-1 and 421-2 are integrally connected through a cover connection part 422. In the current embodiment, the meaning of integral covers includes covers formed in one-piece by, for example, forging or casting. The cover connection part 422 may be connected to the two covers 421-1 and 421-2 by a method such as welding, brazing, or soldering. In the case where a method such as welding, brazing, or soldering is used to connect electrochemical cells in series after the electrochemical cells are completely manufactured, there are many limitations in using such a method. Therefore, according to the current embodiment, two covers 421-1 and 421-2 may be connected to each other using a cover connection part 422 before a process of manufacturing electrochemical cells. This is more easy and reliable.

Optionally, two core insertion holes 423-1 and 423-2 may be formed in the integral covers at positions spaced a predetermined distance from each other. In detail, the core insertion hole 423-1 is formed at the center of the core 421-1, and the core insertion hole 423-2 is formed at the center of the core 421-2. In an assembly process, cores may inserted into the core insertion holes 423-1 and 423-2, voltage equalizing wires may extend outward through the core insertion holes 423-1 and 423-2, electrolyte may be injected through the core insertion holes 423-1 and 423-2, and safety vents may be installed at the core insertion holes 423-1 and 423-2 after electrolyte is injected.

The covers 421-1 and 421-2 are used for the same purpose as the covers 150 illustrated in FIG. 13. Terminal grooves 424 are formed in the covers 421-1 and 421-2 in parallel with the cover connection part 422.

When a terminal is connected to a current collector by laser welding, a whole electrochemical cell may be rotated if terminal grooves are radially formed as shown in FIG. 14. However, if the terminal grooves 424 are parallel with the cover connection part 422, laser welding can be performed more conveniently because it is not necessary to rotate a whole electrochemical cell. Therefore, according to the current embodiment, when modularized electrochemical cells are connected in series, additional welding or screwing may be unnecessary. This method can be used for connecting all modularized electrochemical cells in series, or connecting some of electrochemical cells in series during a modularization process.

FIG. 42 is a front perspective view illustrating modularized electrochemical cells connected in series by using the integral covers illustrated in FIG. 41, according to an exemplary embodiment. Four electrochemical cells are connected in series using the integral covers (terminals).

FIG. 43 is a rear perspective view illustrating the modularized electrochemical cells connected in series by using the integral cover of FIG. 41, according to an exemplary embodiment.

If the electrochemical cells are abnormally operated, flammable gas such as hydrogen gas and toxic gas such as solvent vapor may be discharged through the safety vent 220 illustrated in FIG. 18. Therefore, if the electrochemical cells are used in an indoor area or a place where a fire can be easily caused by flammable gas discharged from the electrochemical cells, it is necessary to exhaust gas discharged from the electrochemical cell by, for example, connecting a hose to a gas discharge hole of the safety vent 220.

Therefore, when modularized electrochemical cells are connected in series as shown in FIGS. 42 and 43, a manifold 430 shown in FIG. 44 can be connected to the electrochemical cells to exhaust gas discharged from the electrochemical cells.

FIG. 44 is a perspective view illustrating a manifold configured to be attached to safety vents of modularized electrochemical cells according to an exemplary embodiment.

As shown in FIG. 44, the manifold 430 includes regularly spaced four connection holes 431 to 434 which can be connected to gas discharge holes of safety vents 220, and a gas discharge hole 435 at an end of the manifold 430. A gas discharge hose can be connected to the gas discharge hole 435 of the manifold 430.

FIG. 45 is a perspective view illustrating the manifold of FIG. 44 coupled to modularized electrochemical cells according to an exemplary embodiment.

As shown in FIG. 45, the manifold 430 is connected to the backside of the series electrochemical cells illustrated in FIG. 43. The connection holes of the manifold 430 are aligned with the core insertion holes of the cover connection parts 422 and connected to the gas discharge holes of the safety vents 220.

A gas discharge hose 440 is connected to the gas discharge hole 435 of the manifold 430. A gas detecting unit may be installed at the manifold 430 to detect a rupture of the safety vent 220. In an embodiment, electrochemical cells can be connected in series by using a general connection method instead of using the integral cover.

As described above, gas generated in the series electrochemical cells can be discharged to the outside by connecting the manifold 430 to the series electrochemical cells, and the gas can be transferred to a desired place by connecting the gas discharge hose 440 to the manifold 430.

FIG. 47 is a view illustrating a dissembled state of integrated mono polar and quasi-bipolar electrodes of an electrochemical cell according to an exemplary embodiment.

As shown in FIG. 47, the mono polar electrodes 510 and the quasi-bipolar electrode 520 can be integrated using strips 530 to form an electrochemical cell.

The mono polar electrodes 510 are substantially the same as the mono polar electrode 110 illustrated in FIG. 8, and the quasi-bipolar electrode 520 is substantially the same as the quasi-bipolar electrode 120 illustrated in FIG. 8.

However, the mono polar electrodes 510 are different from the mono polar electrode 110 illustrated in FIG. 8, in that a current collector 511 of the mono polar electrode 510 extends from both sides of active material layers 511.

The quasi-bipolar electrode 520 is different from the quasi-bipolar electrode 120 illustrated in FIG. 8, in that a current collector 521 of the quasi-bipolar electrode 520 extends outward from active material layers 522 and 523.

In this way, current collectors of the mono polar electrodes 510 and the quasi-bipolar electrode 120 are extended toward each other, so that the extended current collectors can be connected using the strips 530.

FIG. 48 is a view illustrating an assembled state of the integrated mono polar and quasi-bipolar electrodes of an electrochemical cell according to an exemplary embodiment.

As shown in FIG. 48, the mono polar electrodes 510 and the quasi-bipolar electrode 520 are integrated by connected the mono polar electrodes 510 and the quasi-bipolar electrode 520 using the strips 530.

FIG. 49 is a view illustrating a dissembled state of integrated quasi-bipolar electrodes of an electrochemical cell according to an exemplary embodiment.

As shown in FIG. 49, quasi-bipolar electrodes 610 and 620 constituting an electrochemical cell can be integrated using strips 630.

The quasi-bipolar electrodes 610 and 620 are substantially the same as the quasi-bipolar electrode 120 illustrated in FIG. 8.

However, the quasi-bipolar electrodes 610 and 620 are different from the quasi-bipolar electrode 120 illustrated in FIG. 8, in that a current collector 611 of the quasi-bipolar electrode 610 and a current collector 621 of the quasi-bipolar electrode 620 are extended toward each other.

Since the current collectors 611 and 621 are extended toward each other, the current collectors 611 and 621 can be coupled to each other using the strips 530.

FIG. 50 is a view illustrating an assembled state of the integrated quasi-bipolar electrodes of an electrochemical cell according to an exemplary embodiment.

As shown in FIG. 50, the quasi-bipolar electrodes 610 and 620 are integrated by connecting the quasi-bipolar electrodes 610 and 620 using the strips 630.

FIG. 51 is a view illustrating a process of winding integrated electrodes around a core according to an exemplary embodiment.

Electrodes to be wound around a core in the same layer are integrated so that an electrode assembly can be easily assembled.

Referring to FIG. 51, integrated electrodes such as those shown in FIGS. 48 and 50 are wound around a core 710 to form an electrode assembly. Therefore, as compared with the case where separate electrodes are wound around a core, an electrode assembly can be formed by winding fewer electrodes around a core, and thus the electrode winding process can be easily performed.

As described above, embodiments provides a modularized quasi-bipolar electrochemical cell, which can be applied to an ultracapacitor such as an electric double layer capacitor, and to other electric energy storage devices such as a lead acid battery, a NiMH battery, a NiCd battery, a lithium ion battery, and an aluminum electrolytic capacitor.

In the above-described descriptions, an electric double layer capacitor is illustrated as an example for explaining an electrochemical cell of the present invention; however, the present invention is not limited to the electric double layer capacitor. For example, the present invention can be applied to an electrochemical cell such as a battery using liquid electrolyte and an aluminum electrolytic capacitor. While structures, operations, manufacturing methods have been particularly shown and described with reference to exemplary embodiments, it will be understood by those of ordinary skill in the art that various changes in form and details may be made therein without departing from the spirit and scope of the present invention.

The invention claimed is:

1. An electrochemical cell comprising:
an electrode comprising a current collector, and positive and negative active material layers disposed at both sides of the current collector and spaced apart from each other with a current collector extension part being located therebetween, wherein a polarity of the electrode is used as an opposite polarity in a neighboring cell;
a hollow core;
an electrolyte isolation barrier wall disposed at the current collector extension part of the electrode;
a case accommodating an electrode assembly formed by winding at least one electrode including the electrode around the core; and
an electrolyte injection port disposed in a side surface of the case and connected to an inside area of the core, wherein a plurality of first electrolyte injection holes are formed in the current collector extension part of the electrode at predetermined intervals, and
one or more second electrolyte injection holes corresponding to the first electrolyte injection holes are formed in a sidewall of the core.

2. The electrochemical cell of claim 1, wherein the second electrolyte injection holes formed in the core are arranged in radial directions of a center axis of the core and correspond to each other.

3. The electrochemical cell of claim 1, wherein the electrolyte isolation barrier wall is formed of a material including an adhesive.

4. The electrochemical cell of claim 1, wherein the electrolyte isolation barrier wall is formed of rubber.

5. The electrochemical cell of claim 1, wherein the electrolyte isolation barrier wall is formed of a conductive material.

6. The electrochemical cell of claim 1, wherein the first electrolyte injection holes are formed in the current collector extension part at both sides of the electrolyte isolation barrier wall.

7. The electrochemical cell of claim 1, wherein a plurality of holes are formed in the core in a center axis direction of the core and connected to the second electrolyte injection holes.

8. The electrochemical cell of claim 1, wherein a safety vent is provided at the electrolyte injection port disposed in the side surface of the case.

9. The electrochemical cell of claim 8, wherein the safety vent comprises a membrane capable of transmitting gas.

10. The electrochemical cell of claim 1, further comprising a connection part through which an electric connection to the electrode from an outside of the electrochemical cell is allowed.

11. The electrochemical cell of claim 10, wherein holes are formed in the sidewall of the core and the side surface of the case, and the electrochemical cell further comprises a conductive line inserted in the core through the holes and electrically connected to the electrode.

12. The electrochemical cell of claim 11, wherein the conductive line is electrically connected to the current collector extension part of the electrode by a conductive adhesive.

13. The electrochemical cell of claim 11, wherein a plurality of holes are formed in the core in a center-axis direction of the core for accommodating the conductive line inserted in the in the hole formed in the sidewall of the core.

14. The electrochemical cell of claim 11, wherein the conductive line inserted in the core extends outward through the hole formed in the sidewall of the core and is wound around the core.

15. The electrochemical cell of claim 1, further comprising a strip attached to a position at which the electrolyte isolation barrier wall is disposed.

16. The electrochemical cell of claim 1, wherein the case is formed by winding a sheet including an adhesive around the electrode assembly after forming the electrolyte isolation barrier wall on an outer side of the electrode assembly.

17. The electrochemical cell of claim 16, wherein the electrolyte isolation barrier wall comprises an adhesive material.

18. The electrochemical cell of claim 16, wherein the adhesive is a heat adhesion sheet.

19. The electrochemical cell of claim 16, wherein the sheet is a metal sheet.

20. The electrochemical cell of claim 16, wherein the sheet comprises a metal film.

21. The electrochemical cell of claim 1, wherein the electrolyte isolation barrier wall is formed on an outer side of the electrode assembly using an adhesive material, and a heat shrinkable tube is used as the case.

22. The electrochemical cell of claim 16, wherein the electrolyte isolation barrier wall is disposed between a portion of the case and the electrode assembly, and a reinforcement part is disposed on an outer surface of the portion of the case.

23. The electrochemical cell of claim 21, wherein the electrolyte isolation barrier wall is disposed between a portion of the case and the electrode assembly, and a reinforcement part is disposed on an outer surface of the portion of the case.

24. The electrochemical cell of claim 1, wherein the current collector has a greater thickness at a center portion where the positive and negative active materials are not disposed than at portions where the positive and negative active materials are disposed.

25. The electrochemical cell of claim 1, wherein the electrolyte isolation barrier wall is disposed on an outer surface of the electrode assembly, the case accommodates the electrode assembly, and a bead is formed at a portion of the case corresponding to the electrolyte isolation barrier wall.

26. The electrochemical cell of claim 1, wherein the case comprises a plurality of metal tubes, at least one insulation sealing part connecting the metal tubes neighboring each other, and a bead formed at one of the metal tubes disposed at the electrolyte isolation barrier wall that is conductive.

* * * * *